US009919690B2

(12) United States Patent
Miyazaki

(10) Patent No.: US 9,919,690 B2
(45) Date of Patent: Mar. 20, 2018

(54) BRAKE DEVICE FOR VEHICLE

(75) Inventor: Tetsuya Miyazaki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 456 days.

(21) Appl. No.: 14/419,078

(22) PCT Filed: Aug. 8, 2012

(86) PCT No.: PCT/JP2012/070150
§ 371 (c)(1),
(2), (4) Date: Feb. 2, 2015

(87) PCT Pub. No.: WO2014/024267
PCT Pub. Date: Feb. 13, 2014

(65) Prior Publication Data
US 2015/0203086 A1 Jul. 23, 2015

(51) Int. Cl.
*B60T 13/68* (2006.01)
*B60T 8/88* (2006.01)
(Continued)

(52) U.S. Cl.
CPC .............. *B60T 13/686* (2013.01); *B60T 7/04* (2013.01); *B60T 7/042* (2013.01); *B60T 8/321* (2013.01);
(Continued)

(58) Field of Classification Search
CPC . B60T 7/04; B60T 7/042; B60T 8/321; B60T 8/4072; B60T 8/4081; B60T 8/885;
(Continued)

(56) References Cited

U.S. PATENT DOCUMENTS 6,659,569 B2 * 12/2003 Fukasawa ............. B60T 8/4081
303/122
2006/0238024 A1 10/2006 Akita
(Continued)

FOREIGN PATENT DOCUMENTS

CN 1853997 A 11/2006
JP 2008 62782 3/2008
(Continued)

OTHER PUBLICATIONS

International Search Report dated Nov. 6, 2012 in PCT/JP12/070150 Filed Aug. 8, 2012.
(Continued)

*Primary Examiner* — Logan Kraft
(74) *Attorney, Agent, or Firm* — Oblon, McClelland, Maier & Neustadt, L.L.P.

(57) ABSTRACT

A master cylinder generates master cylinder pressures in response to a brake operation by a driver on a brake pedal. A power hydraulic pressure generation device includes a pressure pump and an accumulator, and the accumulator accumulates an accumulator pressure increased by the pressure pump. A hydraulic pressure control valve device includes holding valves, pressure decreasing valves, and master cut valves for carrying out transmission of the master cylinder pressures from the master cylinder or the accumulator pressure from the accumulator. A stroke simulator is connected to a master pressure pipe via a simulator cut valve. The normally-open master cut valves and the normally-closed simulator cut valve for carrying out transmission of the master cylinder pressures mechanically generated by the master cylinder are backed up with backup electric power so that the operations continue even in the event of a change in state of electric power supply.

17 Claims, 10 Drawing Sheets

(51) Int. Cl.
  *B60T 8/32* (2006.01)
  *B60T 8/40* (2006.01)
  *B60T 7/04* (2006.01)
  *B60T 13/16* (2006.01)
  *B60T 13/14* (2006.01)
  *B60T 13/66* (2006.01)

(52) U.S. Cl.
  CPC ............ *B60T 8/4081* (2013.01); *B60T 8/885* (2013.01); *B60T 13/146* (2013.01); *B60T 13/161* (2013.01); *B60T 13/662* (2013.01); *B60T 2270/414* (2013.01)

(58) Field of Classification Search
  CPC ........ B60T 8/94; B60T 13/141; B60T 13/146; B60T 13/161; B60T 13/662; B60T 13/686; B60T 2270/414
  See application file for complete search history.

(56) References Cited

U.S. PATENT DOCUMENTS

| | | |
|---|---|---|
| 2007/0188019 A1 | 8/2007 | Maki et al. |
| 2009/0230762 A1 | 9/2009 | Giers et al. |
| 2011/0241417 A1 | 10/2011 | Miyazaki et al. |
| 2011/0314806 A1* | 12/2011 | Ishizuka ................ B60T 7/042 60/545 |

FOREIGN PATENT DOCUMENTS

| | | |
|---|---|---|
| JP | 2009 511337 | 3/2009 |
| JP | 2009 227093 | 10/2009 |
| WO | 2011 061808 | 5/2011 |

OTHER PUBLICATIONS

Combined Chinese Office Action and Search Report dated May 30, 2016 in Patent Application No. 201280075148.0 (with English translation of categories of cited documents).

* cited by examiner

BRAKE DEVICE FOR VEHICLE

TECHNICAL FIELD

The present invention relates to a brake device for a vehicle, including a master cylinder for generating a hydraulic pressure in response to an operation by a driver on a brake pedal, a power hydraulic pressure source for generating a hydraulic pressure through drive of a pressure pump, a valve mechanism including a plurality of electromagnetic valves to be controlled by electric signals, for carrying out transmission of the hydraulic pressure output from the master cylinder or the power hydraulic pressure source, and a wheel cylinder for applying a braking force to a wheel through the transmission of the hydraulic pressure output from the master cylinder or the power hydraulic pressure source via the valve mechanism.

BACKGROUND ART

In recent years, there has been proposed a brake device for a vehicle, which is capable of selectively supplying, to wheel cylinders, a hydraulic pressure generated by a pressure pump (accumulator) serving as a power hydraulic pressure source and a hydraulic pressure generated on the master cylinder coupled to a brake pedal operated by a driver. For example, as the brake device of this type, hitherto, a brake device for an automobile disclosed in Patent Literature 1 and a brake device for a vehicle disclosed in Patent Literature 2 are known.

In the related-art brake device for an automobile and the related-art brake device for a vehicle, communication between the master cylinder and the wheel cylinders is shut off by an electromagnetic valve during a normal state, and a target hydraulic pressure is set in response to a driver's operation of depressing the brake pedal so that a hydraulic pressure increased by the pressure pump (accumulator) is controlled to follow the set target hydraulic pressure by operating various electromagnetic valves. Further, in the related-art brake device for an automobile, a pedal travel simulator including an electromagnetic valve is provided so that the driver can appropriately carry out the operation of depressing the brake pedal during the normal state.

CITATION LIST

Patent Literature

[PTL 1] JP 2009-511337 A
[PTL 2] JP 2008-62782 A

SUMMARY OF INVENTION

Incidentally, in the related-art brake device for an automobile and the related-art brake device for a vehicle, the various electromagnetic valves (electromagnetic on-off valves) are electrically controlled to supply, to the wheel cylinders, the hydraulic pressure corresponding to the driver's operation of depressing the brake pedal. In this case, in general, employment of a capacitor having a large electrical capacity is conceivable as an operation backup for a change in state of the electric power supply, such as a decrease in the electric power of a power supply (battery) installed on the vehicle, so as to securely operate the various electromagnetic valves (electromagnetic on-off valves) in an electrical manner. However, if operations of all the electromagnetic valves (electromagnetic on-off valves) are to be electrically backed up in this case, a large electrical capacity needs to be secured. A brake performance equivalent to that during the normal state is secured, but there is a fear of an increase in cost. Alternatively, a booster circuit may be independently provided so as to cope with the electric power decrease (voltage decrease) of the power supply (battery) installed on the vehicle, but there is also a fear of an increase in cost in this case.

Therefore, in order to reduce the cost while securing a necessary and sufficient brake performance, it is effective to identify and limit the electromagnetic valves (electromagnetic on-off valves) to be backed up for the operation or to be operated by priority, thereby reducing the electrical capacity required for the electrical backup. In this case, in order to avoid a decrease in merchantability of the brake device for a vehicle as a result of the cost reduction, it is important to identify the electromagnetic valves (electromagnetic on-off valves) to be backed up for the operation so that the driver does not feel a sense of discomfort for the operation, and it is also important to identify electromagnetic valves (electromagnetic on-off valves) to be operated by priority so as to secure an excellent brake performance.

The present invention has been made to solve the above-mentioned problems, and has an object to provide a brake device for a vehicle, which is configured to limit various electromagnetic valves to specific electromagnetic valves and control the specific electromagnetic valves to continue the operation in response to a change in state of electric power supply.

In order to achieve the object, a brake device for a vehicle according to one embodiment of the present invention includes a master cylinder, a power hydraulic pressure source, a valve mechanism, a wheel cylinder, and an electric power supply part.

The master cylinder is configured to generate a hydraulic pressure in response to an operation by a driver on a brake pedal. The power hydraulic pressure source is configured to generate a hydraulic pressure through drive of a pressure pump. The valve mechanism includes a plurality of electromagnetic valves to be controlled by electric signals, and is configured to carry out transmission of the hydraulic pressure output from the master cylinder or the power hydraulic pressure source. The wheel cylinder is configured to apply a braking force to a wheel through the transmission of the hydraulic pressure output from the master cylinder or the power hydraulic pressure source via the valve mechanism. The electric power supply part is configured to supply electric power from an electric power storage device installed on the vehicle, for operations of the plurality of electromagnetic valves constructing the valve mechanism.

The brake device for a vehicle according to one embodiment of the present invention has a feature in that the electric power supply part is configured to limit the plurality of electromagnetic valves constructing the valve mechanism to a specific electromagnetic valve that carries out the transmission of the hydraulic pressure mechanically generated by the master cylinder in response to the operation on the brake pedal, to thereby secure backup electric power for backing up an operation of the limited specific electromagnetic valve independently of the electric power to be supplied from the electric power storage device. In this case, an electrical capacity of the secured backup electric power may be, for example, an electrical capacity for maintaining, in the event of momentary interruption in which the supply of the electric power from the electric power storage device is momentarily interrupted, the operation of the specific electromagnetic valve at least during the momentary interruption.

As a result, the backup of the operation can be carried out by limiting the electromagnetic valves to the specific electromagnetic valve that carries out the transmission of the hydraulic pressure mechanically generated by the master cylinder in response to the operation on the brake pedal directly operated by the driver. Thus, the specific electromagnetic valve can be controlled to continue the operation regardless of the change in the state of the electric power supply. In this case, specifically, in order to respond to the momentary interruption, which is a change in the state of the electric power supply, an electrical capacity at such a degree that the operation of the specific electromagnetic valve is maintained during the momentary interruption only needs to be secured as the backup electric power. As a result, the backup electric power can be appropriately suppressed so that the increase in cost can be avoided. Further, the operation of the specific electromagnetic valve is backed up so that the driver can be made less liable to feel the sense of discomfort for the operation via the brake pedal. Thus, the decrease in merchantability of the brake device for a vehicle can be effectively prevented, and hence, for example, both of the cost reduction and the securement of merchantability can be appropriately realized.

In this case, the specific electromagnetic valve may be an electromagnetic valve for fluctuating, when the electric power supplied by the electric power supply part from the electric power storage device is shut off, a hydraulic pressure mechanically generated by the master cylinder in response to an operation caused by the shutoff of the supply of the electric power. More specifically, the fluctuation in the hydraulic pressure mechanically generated by the master cylinder may involve, for example, changing of a magnitude of a reaction force input to the brake pedal in response to the operation by the driver, or a magnitude of a stroke of the brake pedal operated by the driver.

Further, in those cases, the specific electromagnetic valve may be a normally-open electromagnetic on-off valve, which is supplied with the electric power by the electric power supply part so as to be maintained in a closed state at least when the brake pedal is being operated by the driver. In this case, more specifically, the normally-open electromagnetic on-off valve may be, for example, a master cut valve, which is provided on a hydraulic pressure path through which the hydraulic pressure mechanically generated by the master cylinder is transmitted in response to the operation on the brake pedal, and is supplied with the electric power by the electric power supply part so as to be maintained in the closed state when the hydraulic pressure from the power hydraulic pressure source is being transmitted to the wheel cylinder, to thereby inhibit the hydraulic pressure mechanically generated by the master cylinder from being transmitted to the wheel cylinder.

Further, in those cases, the specific electromagnetic valve may be a normally-closed electromagnetic on-off valve, which is supplied with the electric power by the electric power supply part so as to be maintained in an open state at least when the brake pedal is being operated by the driver. In this case, more specifically, the normally-closed electromagnetic on-off valve may be, for example, a simulator cut valve, which is provided on a hydraulic pressure path through which the hydraulic pressure mechanically generated by the master cylinder is transmitted in response to the operation on the brake pedal, and is supplied with the electric power by the electric power supply part so as to be maintained in the open state at least when the hydraulic pressure from the power hydraulic pressure source is being transmitted to the wheel cylinder, to thereby permit communication between the master cylinder and a stroke simulator for adjusting the magnitude of the reaction force applied to the brake pedal operated by the driver and the magnitude of the stroke of the brake pedal.

As a result, the electromagnetic valve for changing the magnitude of the reaction force in response to the operation and the magnitude of the stroke, which can be sensed by the driver via the brake pedal, can be limited as the specific electromagnetic valve. Thus, the operation of the specific electromagnetic valve is backed up so that the driver can be made less liable to sense the change in the magnitude of the reaction force and the change in the magnitude of the stroke via the brake pedal, and hence, for example, the decrease in merchantability of the brake device for a vehicle can be effectively prevented.

Further, in order to achieve the object, the brake device for a vehicle according to one embodiment of the present invention may include a master cylinder, a power hydraulic pressure source, a valve mechanism, a wheel cylinder, and an electric power supply control part.

The master cylinder is configured to generate a hydraulic pressure in response to an operation by a driver on a brake pedal. The power hydraulic pressure source is configured to generate a hydraulic pressure through drive of a pressure pump. The valve mechanism includes a plurality of electromagnetic valves to be controlled by electric signals, and is configured to carry out transmission of the hydraulic pressure output from the master cylinder or the power hydraulic pressure source. The wheel cylinder is configured to apply a braking force to a wheel through the transmission of the hydraulic pressure output from the master cylinder or the power hydraulic pressure source via the valve mechanism. The electric power supply control part is configured to control supply of electric power from an electric power storage device installed on the vehicle to the plurality of electromagnetic valves constructing the valve mechanism and to the power hydraulic pressure source.

Further, the brake device for a vehicle according to one embodiment of the present invention has another feature in that the electric power supply control part is configured to limit, under a state in which the electric power stored in the electric power storage device is low, the plurality of electromagnetic valves constructing the valve mechanism to a specific electromagnetic valve that carries out the transmission of the hydraulic pressure from the power hydraulic pressure source, to thereby supply the electric power from the electric power storage device to the limited specific electromagnetic valve by priority.

In this case, the power hydraulic pressure source may include an accumulator for accumulating the hydraulic pressure generated through the drive of the pressure pump, and the specific electromagnetic valve may be at least an electromagnetic valve provided on a hydraulic pressure path for communicating the accumulator of the power hydraulic pressure source and the master cylinder to each other. Further, in those cases, the specific electromagnetic valve may be, for example, a normally-closed linear control valve for outputting the hydraulic pressure from the power hydraulic pressure source through linear control.

Further, in this case, the hydraulic pressure path for communicating the accumulator of the power hydraulic pressure source and the master cylinder to each other may further communicate to the wheel cylinder for applying the braking force to a wheel on a front wheel side of the vehicle.

Further, in this case, the specific electromagnetic valve may be a normally-closed electromagnetic on-off valve for permitting or inhibiting the communication between the power hydraulic pressure source and the wheel cylinder for applying the braking force to the wheel on the front wheel side.

As a result, as the change in the state of the electric power supply, for example, under a state in which the function of a charging device (such as an alternator) is not exerted for the electric power storage device so that the electric power stored in the electric power storage device is low, in which a consumption amount of the electric power stored in the electric power storage device increases, or in which the electric power storage device is degraded, the electric power supply control part can supply the electric power by priority to the specific electromagnetic valve that carries out the transmission of the hydraulic pressure from the power hydraulic pressure source (more specifically, the accumulator) for the purpose of securing an excellent brake performance. As a result, for example, even under a state in which various types of control are restricted due to the decrease in the electric power stored in the electric power storage device, the hydraulic pressure accumulated in the accumulator can be used, and thus the braking force can be securely applied to the wheel.

Further, in those cases, under the state in which the electric power stored in the electric power storage device is low, the electric power supply control part may inhibit the supply of the electric power from the electric power storage device to an electric motor constructing the pressure pump when the brake pedal is being operated by the driver. Further, under a state in which the electric power stored in the electric power storage device is significantly low, the electric power supply control part may inhibit the supply of the electric power from the electric power storage device to an electric motor constructing the pressure pump. Still further, under the state in which the electric power stored in the electric power storage device is low, the electric power supply control part may supply the electric power from the electric power storage device to an electric motor constructing the pressure pump when the brake pedal is not being operated by the driver, to thereby accumulate, in the accumulator, the hydraulic pressure generated through the drive of the pressure pump.

As a result, under the state in which the electric power stored in the electric power storage device is low as the change in the state of the electric power supply, the electric power to be consumed by the brake device for a vehicle can be effectively suppressed. As a result, even under a state in which the electric power to be supplied is restricted, for example, the brake device for a vehicle can be controlled to continue the operation by priority over the other onboard devices.

DESCRIPTION OF EMBODIMENTS

Figure 1:
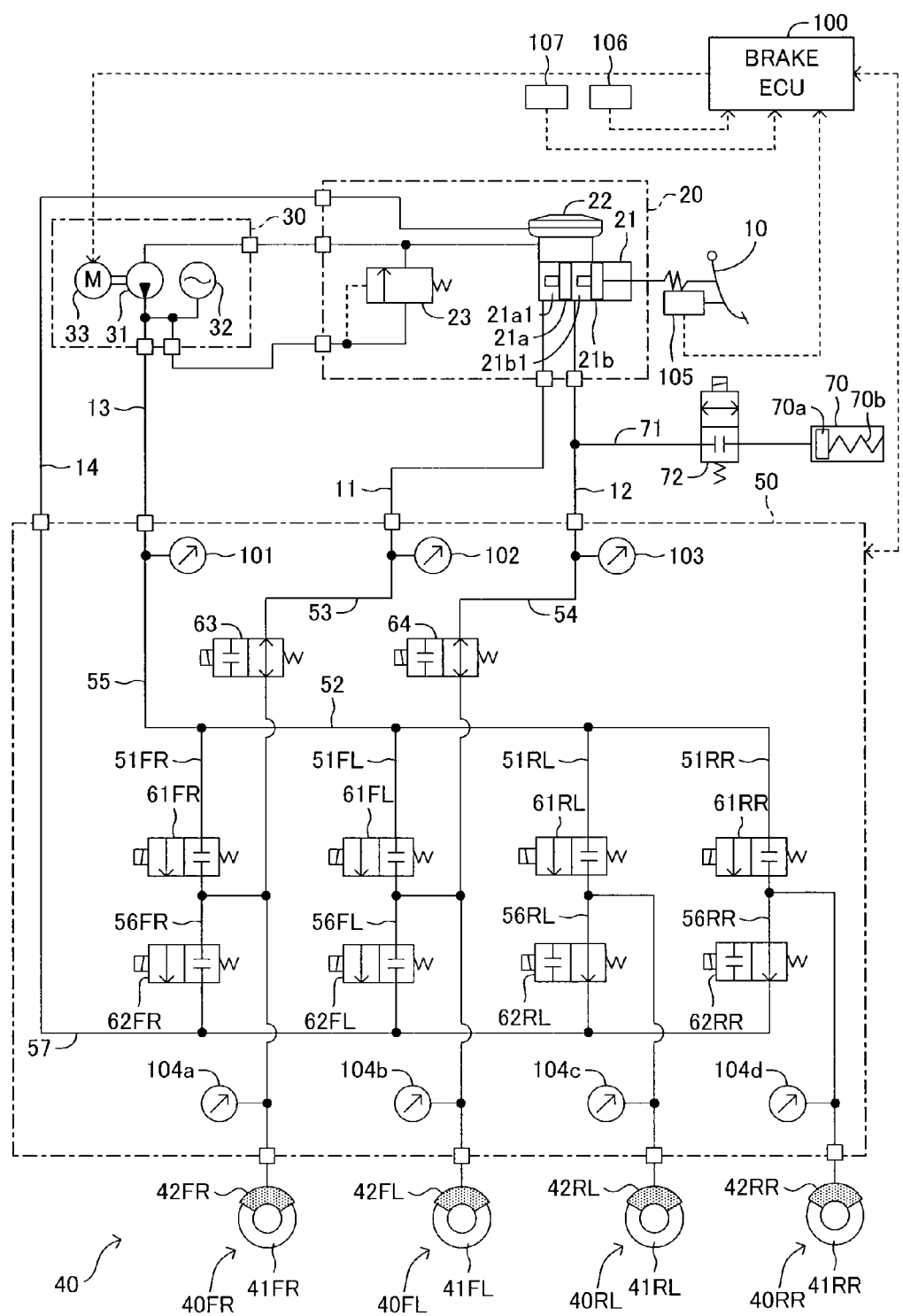
FIG. 1 is a schematic system diagram of a brake device for a vehicle according to an embodiment of the present invention.

Now, a brake device for a vehicle according to an embodiment of the present invention is described referring to the drawings. FIG. 1 is a schematic system diagram of the brake device for a vehicle according to this embodiment.

The brake device for a vehicle includes a brake pedal 10, a master cylinder unit 20, a power hydraulic pressure generation device 30, brake units 40, a hydraulic pressure control valve device 50, and a brake ECU 100 for brake control.

The master cylinder unit 20 includes a master cylinder 21 as mechanical hydraulic pressure generation means and a reservoir 22. The master cylinder 21 is of a tandem type including pressure pistons 21*a* and 21*b*, and generates master cylinder pressures Pmc_FR and Pmc_FL, which are hydraulic pressures mechanically generated with predetermined boost ratios to a pedal depressing force input in response to an operation of depressing the brake pedal 10 by a driver (hereinafter also referred to as brake operation). The reservoir 22 for storing a working fluid is provided at a top of the master cylinder 21. As a result, when the driver's operation of depressing the brake pedal 10 is released and the pressure pistons 21*a* and 21*b* are retreated, in the master cylinder 21, pressure chambers 21*a*1 and 21*b*1 formed by the pressure pistons 21*a* and 21*b* communicate to the reservoir 22. It should be noted that the pressure chambers 21*a*1 and 21*b*1 respectively communicate to the hydraulic pressure control valve device 50 via master pressure pipes 11 and 12 described later.

The power hydraulic pressure generation device 30 is a power hydraulic pressure source (power supply), and includes a pressure pump 31 and an accumulator 32. The pressure pump 31 has an inlet opening connected to the reservoir 22 and an outlet opening connected to the accumulator 32, and pressurizes the working fluid through drive of an electric motor 33. The accumulator 32 converts pressure energy of the working fluid pressurized by the pressure pump 31 into pressure energy of a filler gas such as nitrogen, thereby accumulating the pressure energy. Moreover, the accumulator 32 is connected to a relief valve 23 provided to the master cylinder unit 20. The relief valve 23 opens when the pressure of the working fluid increases to a predetermined pressure or more, thereby returning the working fluid to the reservoir 22.

The brake units 40 more specifically include brake units 40FR, 40FL, 40RR, and 40RL provided on the respective wheels of the vehicle. In the following description, configurations provided on the respective wheels are denoted with such suffixes as FR for the front right wheel, FL for the front left wheel, RR for the rear right wheel, and RL for the rear left wheel, but if the identification of the wheel position is not particularly necessary, the suffixes are omitted. The brake units 40FR, 40FL, 40RR, and 40RL installed on the respective wheels include brake rotors 41FR, 41FL, 41RR, and 41RL, and wheel cylinders 42FR, 42FL, 42RR, and 42RL built into brake calipers. On this occasion, the brake units 40 are not limited to the case where disc brakes are installed on all the four wheels, and, for example, drum brakes may be installed on all the four wheels, or disc brakes and drum brakes may be arbitrarily combined in such a way that disc brakes are installed on the front wheels, and drum brakes are installed on the rear wheels.

The wheel cylinders 42FR, 42FL, 42RR, and 42RL are connected to the hydraulic pressure control valve device 50, and hydraulic pressures of the working fluid (brake fluid) supplied via the hydraulic pressure control valve device 50 are transmitted to the wheel cylinders 42FR, 42FL, 42RR, and 42RL. Then, brake pads, which are friction members, are pressed against the brake rotors 41FR, 41FL, 41RR, and 41RL rotating along with the wheels by the hydraulic pressures transmitted (supplied) via the hydraulic pressure control valve device 50, to thereby apply braking forces to the wheels.

As the hydraulic pressure sources for applying the hydraulic pressures of the working fluid to the wheel cylinders 42 via the hydraulic pressure control valve device 50, the brake device for a vehicle according to this embodiment includes the master cylinder 21 of the master cylinder unit 20 for applying the hydraulic pressures mechanically generated by the pedal depressing force input in response to the driver's operation of depressing the brake pedal 10, and the power hydraulic pressure generation device 30 for applying the hydraulic pressure independently of the master cylinder 21. Further, in the brake device for a vehicle, the master cylinder 21 (more specifically, the pressure chambers 21*a*1 and 21*b*1) and the power hydraulic pressure generation device 30 (more specifically, at least the accumulator 32) are connected respectively to the hydraulic pressure control valve device 50 via the master pressure pipes 11 and 12 and an accumulator pressure pipe 13. Moreover, the reservoir 22 of the master cylinder unit 20 is connected to the hydraulic pressure control valve device 50 via a reservoir pipe 14.

The hydraulic pressure control valve device 50 having a valve mechanism includes four individual flow passages 51FR, 51FL, 51RR, and 51RL connected to the respective wheel cylinders 42FR, 42FL, 42RR, and 42RL, a main flow passage 52 for communicating the individual flow passages 51FR, 51FL, 51RR, and 51RL to each other, master pressure flow passages 53 and 54 for connecting the individual flow passages 51FR and 51FL and the master pressure pipes 11 and 12, respectively, to each other, and an accumulator pressure flow passage 55 for connecting the main flow passage 52 and the accumulator pressure pipe 13 to each other. In this case, the master pressure flow passages 53 and 54 and the accumulator pressure flow passage 55 are connected in parallel with one another to the main flow passage 52.

Holding valves 61FR, 61FL, 61RR, and 61RL, which construct the valve mechanism, are respectively provided on the individual flow passages 51FR, 51FL, 51RR, and 51RL. Those holding valves 61FR, 61FL, 61RR, and 61RL are normally-closed electromagnetic on-off valves each being configured to be maintained in a closed state by a biasing force of a spring in a non-current supply state of a solenoid and to be brought into an open state only during current supply to the solenoid. As a result, the accumulator 32 of the power hydraulic pressure generation device 30 and the wheel cylinders 42 provided on the respective wheels are controlled to communicate to each other via the main flow passage 52 only during the current supply to the solenoids. Thus, when the holding valves 61, which are the normally-closed electromagnetic on-off valves, are in the open state by the current supply to the solenoids, in the brake unit 40, the main flow passage 52 and the wheel cylinders 42 are controlled to communicate to each other, and hence the hydraulic pressure of the working fluid is transmitted from the accumulator 32 of the power hydraulic pressure generation device 30.

Moreover, pressure decreasing individual flow passages 56FR, 56FL, 56RR, and 56RL are respectively connected to the individual flow passages 51FR, 51FL, 51RR, and 51RL. The respective pressure decreasing individual flow passages 56 are connected to a reservoir flow passage 57. The reservoir flow passage 57 is connected to the reservoir 22 via the reservoir pipe 14. Pressure decreasing valves 62FR, 62FL, 62RR, and 62RL, which construct the valve mechanism, are respectively provided at intermediate portions of the pressure decreasing individual flow passages 56FR, 56FL, 56RR, and 56RL. In this embodiment, the pressure decreasing valves 62FR and 62FL provided on the front right and left wheel sides are normally-closed electromagnetic on-off valves each being configured to be maintained in a closed state by a biasing force of a spring in a non-current supply state of a solenoid and to be brought into an open state only during current supply to the solenoid. On the other hand, in this embodiment, the pressure decreasing valves 62RR and 62RL provided on the rear right and left wheel sides are normally-open electromagnetic on-off valves each being configured to be maintained in an open state by a biasing force of a spring in a non-current supply state of a solenoid and to be brought into the closed state only during current supply to the solenoid.

As a result, among the pressure decreasing valves 62FR and 62FL respectively provided on the brake units 40FR and 40FL on the front right and left wheel sides and the pressure decreasing valves 62RR and 62RL respectively provided on the brake units 40RR and 40RL on the rear right and left wheel sides, the pressure decreasing valves on the front right and left wheel sides are the normally-closed electromagnetic on-off valves, and the pressure decreasing valves on the rear right and left wheel sides are the normally-open electromagnetic on-off valves. Thus, when the pressure decreasing valves 62FR and 62FL, which are the normally-closed electromagnetic on-off valves, are in the open states by the current supply to the solenoids on the brake units 40FR and 40FL on the front right and left wheel sides, the pressure decreasing individual flow passages 56FR and 56FL and the reservoir flow passage 57 are controlled to communicate to each other. Moreover, when the pressure decreasing valves 62RR and 62RL, which are the normally-open electromagnetic on-off valves, are in the closed states by the current supply to the solenoids on the brake units 40RR and 40RL on the rear right and left wheel sides, the pressure decreasing individual flow passages 56RR and 56RL and the reservoir flow passage 57 are disconnected from each other.

Master cut valves 63 and 64, which construct the valve mechanism, are provided respectively at intermediate portions of the master pressure flow passages 53 and 54 for transmitting the master cylinder pressures Pmc_FR and Pmc_FL mechanically generated on the master cylinder 21. The respective master cut valves 63 and 64 are normally-open electromagnetic on-off valves each being configured to be maintained in an open state by a biasing force of a spring in a non-current supply state of a solenoid and to be brought into a closed state only during current supply to the solenoid. As a result of providing the master cut valves 63 and 64, when the currents are supplied to the solenoids and the master cut valves 63 and 64 are thus in the closed states, the connection between the master cylinder 21 and the wheel cylinders 42FR and 42FL is shut off, thereby inhibiting the flow of the working fluid. On the other hand, when the currents supplied to the solenoids are shut off and the master cut valves 63 and 64 are thus in the open states, the master cylinder 21 and the wheel cylinders 42FR and 42FL are connected to each other, thereby permitting the flow of the working fluid in both directions between the master cylinder 21 and the wheel cylinders 42FR and 42FL.

Moreover, in this embodiment, a stroke simulator 70 is connected to the master pressure pipe 12 connected to the master pressure flow passage 54 of the hydraulic pressure control valve device 50, for transmitting the master cylinder pressure Pmc_FL mechanically generated on the master cylinder 21. The stroke simulator 70 includes a piston 70a and a spring 70b, and introduces the working fluid in an amount corresponding to a brake operation amount on the brake pedal 10 by the driver into the inside thereof. Then, the stroke simulator 70 displaces the piston 70a against the biasing force of the spring 70b in synchronous with the introduction of the working fluid into the inside, thereby enabling a stroke operation of the brake pedal 10 by the driver, and generating a reaction force corresponding to the brake operation amount to provide excellent brake operation feeling to the driver.

The stroke simulator 70 is connected to the master pressure pipe 12 via a simulator flow passage 71 and a simulator cut valve 72 constructing the valve mechanism. In this case, as a matter of course, the present invention may be carried out so that the stroke simulator 70 is connected to the master pressure pipe 11. The simulator cut valve 72 is a normally-closed electromagnetic on-off valve configured to be maintained in a closed state by a biasing force of a spring in a non-current supply state of a solenoid and to be brought into an open state only during current supply to the solenoid. As a result of providing the simulator cut valve 72, when the simulator cut valve 72 is in the open state, the master cylinder 21 and the stroke simulator 70 are connected to each other via the master pressure pipe 12, thereby permitting the flow of the working fluid (transmission of the master cylinder pressure Pmc_FL) from the master cylinder 21, and the stroke simulator 70 can generate the above-mentioned stroke and a reaction force corresponding to the stroke. On the other hand, when the simulator cut valve 72 is in the closed state, the connection between the master cylinder 21 and the stroke simulator 70 is shut off, thereby inhibiting the flow of the working fluid (transmission of the master cylinder pressure Pmc_FL) from the master cylinder 21.

The power hydraulic pressure generation device 30 and the hydraulic pressure control valve device 50 are controlled to be driven by the brake ECU 100. The brake ECU 100 includes a microcomputer constructed by a CPU, a ROM, a RAM, and the like as main components, and also includes a pump drive circuit, an electromagnetic valve drive circuit, an interface for inputting various sensor signals, and a communication interface. In this embodiment, the electromagnetic valve drive circuit corresponds to an electric power supply part of the present invention, and the brake ECU 100, the electromagnetic valve drive circuit, and the pump drive circuit each correspond to an electric power supply control part of the present invention. As a result, the electric motor 33 for driving the pressure pump 31 provided on the power hydraulic pressure generation device 30 is connected to the brake ECU 100 via the pump drive circuit, and is controlled to be driven by a motor drive signal (electric signal) output from the brake ECU 100. It should be noted that the pump drive circuit is connected to a battery (not shown) installed on the vehicle and serving as an electric power storage device, and supplies predetermined electric power to the electric motor 33.

All of the holding valves 61, the pressure decreasing valves 62, and the master cut valves 63 and 64 provided on the hydraulic pressure control valve device 50 and the simulator cut valve 72 provided on the stroke simulator 70 are connected to the brake ECU 100 via the electromagnetic valve drive circuit, and the open/close operations thereof are controlled by solenoid drive signals (electric signals) output from the brake ECU 100. It should be noted that the electromagnetic valve drive circuit is also connected to the battery (not shown) installed on the vehicle and serving as the electric power storage device, and supplies predetermined electric power to the solenoid of each of the electromagnetic on-off valves 61 to 64 and 72.

Figure 2:
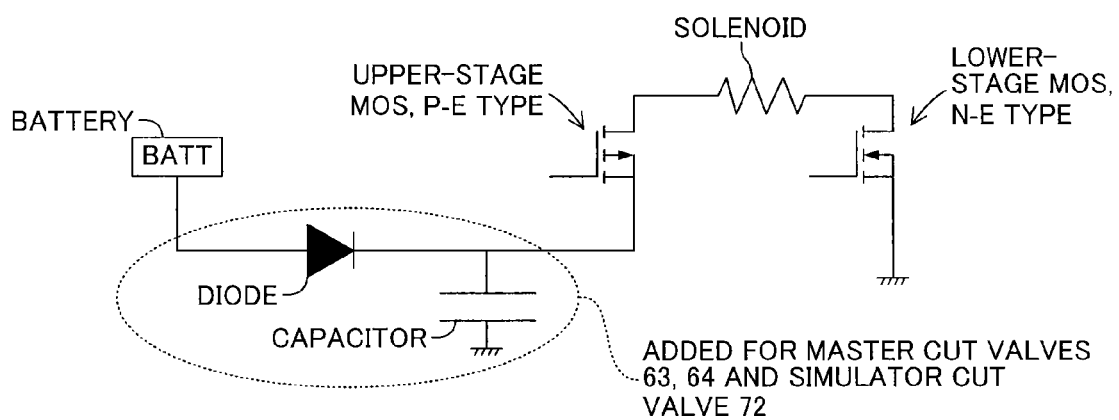
FIG. 2 is a schematic circuit diagram illustrating an electromagnetic valve drive circuit connected to each of master cut valves and a simulator cut valve of FIG. 1.

On this occasion, in this embodiment, the master cut valves 63 and 64 and the simulator cut valve 72 that carry out transmission of the master cylinder pressures Pmc_FR and Pmc_FL, which are the hydraulic pressures mechanically generated on the master cylinder 21 in response to the brake operation by the driver on the brake pedal 10, via a master pressure path constructed by the master pressure pipes 11 and 12 and the master pressure flow passages 53 and 54 correspond to "limited specific electromagnetic valves" of the present invention. Thus, as illustrated in FIG. 2, a capacitor and a diode for securing backup electric power are added to the electromagnetic valve drive circuit connected to the master cut valves 63 and 64 and the simulator cut valve 72. As illustrated in FIG. 2, a general electromagnetic valve drive circuit connected to the electromagnetic on-off valve (electromagnetic valve) other than the master cut valves 63 and 64 and the simulator cut valve 72 includes an upper-stage MOS (P-E type) and a lower-stage MOS (N-E type) connected to the battery for the solenoid of the electromagnetic on-off valve, and the added capacitor and the diode are, for example, arranged between the battery and the upper-stage MOS.

As a result, as described later, even under the state in which the electric power supplied from the battery to the master cut valves 63 and 64 and the simulator cut valve 72 is momentarily (only for a short period) interrupted, that is, so-called momentary interruption occurs, the electric power is continuously supplied to the master cut valves 63 and 64 and the simulator cut valve 72 by discharging of the capacitors during a momentary interruption period in which the momentary interruption occurs. An electrical capacity of the capacitor provided in the electromagnetic valve drive circuit, namely, an electric capacity of the secured backup electric power, only needs to be a capacity at such a degree that the operation of the electromagnetic on-off valve (electromagnetic valve) is maintained in the momentary interruption period, and for example, the electrical capacity only needs to be approximately 1,000 µF for the electromagnetic valve drive circuit connected to each of the master cut valves 63 and 64, and approximately 500 µF for the electromagnetic valve drive circuit connected to the simulator cut valve 72.

As illustrated in FIG. 1, the hydraulic pressure control valve device 50 includes an accumulator pressure sensor 101, master cylinder pressure sensors 102 and 103, and control pressure sensors 104a, 104b, 104c, and 104d as hydraulic pressure detection means. The accumulator pressure flow passage 55 communicates to the accumulator 32 via the accumulator pressure pipe 13, and hence the accumulator pressure sensor 101 detects a hydraulic pressure of the working fluid in the accumulator pressure flow passage 55 on the power hydraulic pressure generation device 30 side (upstream side) with respect to the main flow passage 52, namely, an accumulator pressure Pacc. The accumulator pressure sensor 101 outputs a signal representing the detected accumulator pressure Pacc to the brake ECU 100. With this, the brake ECU 100 reads the accumulator pressure Pacc at a predetermined cycle, and, if the accumulator pressure Pacc is less than the predetermined lowest set pressure, the brake ECU 100 drives the electric motor 33 to pressurize the working fluid by the pressure pump 31, thereby controlling the accumulator pressure Pacc to be always maintained within a set pressure range.

The master pressure flow passage 53 communicates to the pressure chamber 21a1 via the master pressure pipe 11, and hence the master cylinder pressure sensor 102 detects a hydraulic pressure of the working fluid in the master pressure flow passage 53 on the master cylinder 21 side (upstream side) with respect to the master cut valve 63, namely, the master cylinder pressure Pmc_FL. The master pressure flow passage 54 communicates to the pressure chamber 22b1 via the master pressure pipe 12, and hence the master cylinder pressure sensor 103 detects a hydraulic pressure of the working fluid in the master pressure flow passage 54 on the master cylinder 21 side (upstream side) with respect to the master cut valve 64, namely, the master cylinder pressure Pmc_FL. The master cylinder pressure sensors 102 and 103 output signals representing the detected master cylinder pressures Pmc_FR and Pmc_FL to the brake ECU 100. The control pressure sensors 104a, 104b, 104c, and 104d respectively output, to the brake ECU 100, signals representing control pressures Px (corresponding to wheel cylinder pressures in the respective wheel cylinders 42), which are hydraulic pressures of the working fluid in the respective individual flow passages 51FR, 51FL, 51RR, and 51RL.

Moreover, a stroke sensor 105 provided on the brake pedal 10 is connected to the brake ECU 100. The stroke sensor 105 outputs, to the brake ECU 100, a signal representing a pedal stroke Sm, which is a depressing amount (brake operation amount) of the brake pedal 10 by the driver. Moreover, a wheel speed sensor 106 is connected to the brake ECU 100. The wheel speed sensor 106 detects a wheel speed Vx, which is a rotational speed of the front and rear right and left wheels, and outputs the signal representing the detected wheel speed Vx to the brake ECU 100. Further, an indicator 107 for notifying the driver of an abnormality occurring on the brake device for a vehicle is connected to the brake ECU 100. The indicator 107 follows the control by the brake ECU 100, and notifies the driver of the abnormality thus occurring.

Figure 3:
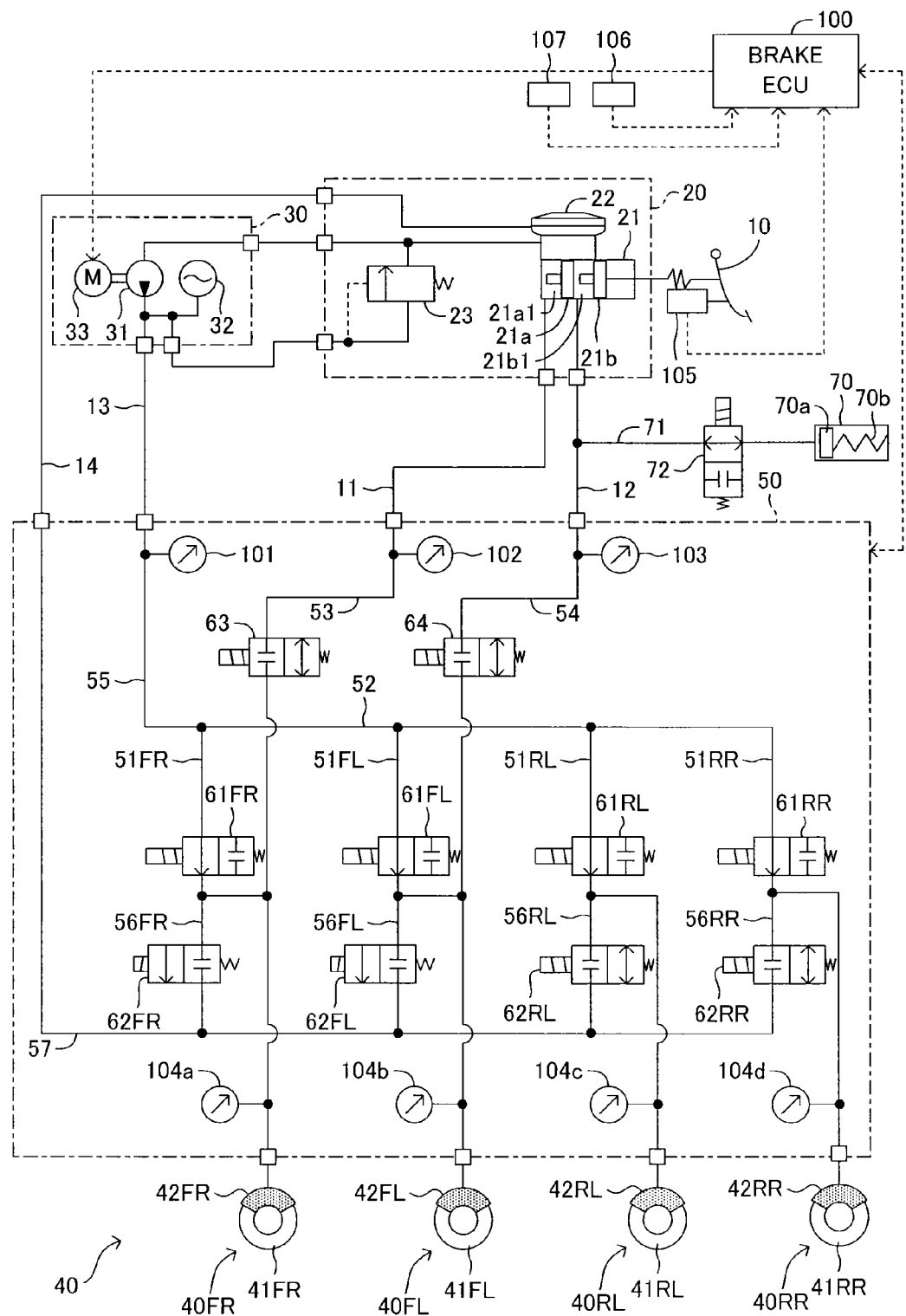
FIG. 3 is a diagram illustrating brake control by the brake device for a vehicle according to the embodiment of the present invention.

A description is now given of brake control carried out by the brake ECU 100. As illustrated in FIG. 3, the brake ECU 100 maintains the normally-open master cut valves 63 and 64 in the closed state by the current supply to the solenoids, and maintains the normally-closed simulator cut valve 72 in the open state by the current supply to the solenoid in normal brake control, in which the hydraulic pressure of the working fluid output from the power hydraulic pressure generation device 30, namely, the accumulator pressure Pacc, is used to operate the respective brake units 40. As a result, the driver carries out the brake operation on the brake pedal 10 while sensing the reaction force by the stroke simulator 70 under the state in which the communication between the master cylinder 21 and the front right and left wheel cylinders 42FR and 42FL are shut off.

Moreover, the brake ECU 100 uses the accumulator pressure Pacc output from the power hydraulic pressure generation device 30 to realize the control pressures Px (namely, the wheel cylinder pressures) at the respective wheel cylinders 42 in response to the brake operation by the driver. In other words, as illustrated in FIG. 3, the brake ECU 100 brings the normally-closed holding valves 61 in the hydraulic pressure control valve device 50 into the open states by the current supply to the solenoids to increase the control pressures Px at the wheel cylinders 42, and brings the holding valves 61 into the closed states by the non-current supply to the solenoids to maintain the control pressures Px at the wheel cylinders 42.

Moreover, the brake ECU 100 brings the normally-closed pressure decreasing valves 62FR and 62FL into the closed states by the non-current supply to the solenoids to increase or maintain the control pressures Px at the wheel cylinders 42FR and 42FL, and brings the pressure decreasing valves 62FR and 62FL into the open states by the current supply to the solenoids to decrease the control pressures Px at the wheel cylinders 42FR and 42FL. Moreover, as illustrated in FIG. 3, the brake ECU 100 brings the normally-open pressure decreasing valves 62RR and 62RL into the closed states by the current supply to the solenoids to increase or maintain the control pressures Px at the wheel cylinders 42RR and 42RL, and brings the pressure decreasing valves 62RR and 62RL into the open states by the non-current supply to the solenoids to decrease the control pressures Px at the wheel cylinders 42RR and 42RL.

Although the detailed description is omitted, the brake ECU 100 can determine, for example, whether widely-known anti-lock brake control or the like needs to be carried out or not based on the wheel speed Vx detected by the wheel speed sensor 106. Then, when the widely-known anti-lock brake control or the like needs to be carried out, the brake ECU 100 controls the current supply to the respective solenoids of the holding valves 61 and the pressure decreasing valves 62 by following the anti-lock brake control or the like, to thereby bring the holding valves 61 and the pressure decreasing valves 62 into the open states or the closed states.

Incidentally, the vehicle on which the brake device for a vehicle according to this embodiment is installed may be, for example, an electric vehicle (EV) including a running motor driven by a battery power supply for high-voltage drive, a hybrid vehicle (HV) including an internal combustion engine in addition to the running motor, and a plug-in hybrid vehicle (PHV), which is a hybrid vehicle (HV) further including a drive battery rechargeable by using an external power supply. Each of those vehicles can carry out regenerative braking in the following manner. Electric power is generated by converting rotational energy of the wheels into electric energy by the running motor, thereby generating electricity, and the drive battery is charged by using the generated electric power, thereby acquiring a braking force.

If the regenerative braking is carried out, a braking force is generated by the brake device for a vehicle, which is acquired by subtracting a regenerative braking force amount from a total braking force required for braking the vehicle, thereby carrying out brake regeneration cooperative control by using both the regenerative braking and the hydraulic braking.

Specifically, the brake ECU 100 receives a braking request, and then starts the brake regeneration cooperative control. The braking request is generated when the braking force needs to be applied to the vehicle, for example, when the driver carries out the brake operation on the brake pedal 10, or when automatic braking needs to be operated. In this case, the automatic braking may be operated in traction control, vehicle stability control, headway distance control, collision prevention control, and the like, and if control start conditions for those kinds of control are satisfied, the braking request is generated.

When the brake ECU 100 receives the braking request, the brake ECU 100 acquires at least one of the master cylinder pressure Pmc_FR detected by the master cylinder pressure sensor 102, the master cylinder pressure Pmc_FL detected by the master cylinder pressure sensor 103, and the stroke Sm detected by the stroke sensor 105 as the brake operation amount, and calculates a target braking force that increases along with an increase in the master cylinder pressure Pmc_FR, the master cylinder pressure Pmc_FL, and/or the stroke Sm. Regarding the brake operation amount, the present invention may also be carried out so that the target braking force is calculated based on, for example, a pedal depressing force acquired by providing a depressing force sensor for detecting the pedal depressing force on the brake pedal 10 in place of the acquisition of the master cylinder pressure Pmc_FR, the master cylinder pressure Pmc_FL, and/or the stroke Sm.

The brake ECU 100 transmits information representing the calculated target braking force to a hybrid ECU (not shown). The hybrid ECU calculates the braking force generated by the power regeneration among the target braking forces, and transmits information representing the regenerative braking force, which is a calculation result, to the brake ECU 100. As a result, the brake ECU 100 calculates the target hydraulic pressure braking force, which is a braking force to be generated on the brake device for a vehicle, by subtracting the regenerative braking force from the target braking force. In this case, the regenerative braking force generated by the power regeneration carried out by the hybrid ECU is changed not only by the rotational speed of the running motor but also by the regenerative power control depending on a charged state (state of charge: SOC) of the drive battery. Thus, an appropriate target hydraulic pressure braking force can be calculated by subtracting the regenerative braking force from the target braking force.

Then, the brake ECU 100 calculates, based on the calculated target hydraulic pressure braking force, a target hydraulic pressure for each of the wheel cylinders 42 corresponding to the target hydraulic pressure braking force, and controls the holding valves 61 and the pressure decreasing valves 62 to open or close by feedback control so that the respective control pressures Px (=wheel cylinder pressures) become equal to the target hydraulic pressure.

In other words, the brake ECU 100 brings the holding valves 61 into the open states, and brings the pressure decreasing valves 62 into the closed states to supply the accumulator pressure Pacc. Thus, the control pressures Px (=wheel cylinder pressures) of the respective wheel cylinders 42 are increased, and braking forces are generated on the wheels. Moreover, the brake ECU 100 brings the holding valves 61 into the closed states, and brings the pressure decreasing valves 62 into the closed states to maintain the control pressures Px (=wheel cylinder pressures) of the respective wheel cylinders 42. Thus, braking forces are generated on the wheels. Further, the brake ECU 100 brings the holding valves 61 into the closed states, and brings the pressure decreasing valves 62 into the open states to control the wheel cylinders 42 to communicate to the reservoir flow passage 57, to thereby discharge the working fluid. Thus, the control pressures Px (=wheel cylinder pressures) of the respective wheel cylinders 42 are decreased, and the braking forces generated on the wheels can be appropriately adjusted.

Then, for example, when the brake operation by the driver on the brake pedal 10 is released, the current supply to the solenoids of the respective electromagnetic on-off valves 61 to 64 and 72 is shut off, and hence all the electromagnetic on-off valves 61 to 64 and 72 are returned to original positions illustrated in FIG. 1. As described above, as a result of returning all the electromagnetic on-off valves 61 to 64 and 72 to the original positions, the hydraulic pressure (high-pressure working fluid) of the wheel cylinder 42FR for the front right wheel is returned to the master cylinder 21 and the reservoir 22 via the master cut valve 63 in the open state through the master pressure flow passage 53 and the master pressure pipe 11 (namely, the master pressure path). The hydraulic pressure (high-pressure working fluid) of the wheel cylinder 42FL for the front left wheel is returned to the master cylinder 21 and the reservoir 22 via the master cut valve 64 in the open state through the master pressure flow passage 54 and the master pressure pipe 12 (namely, the master pressure path).

Under the state in which the brake operation is released, the pressure pistons 21a and 21b are retreated, resulting in the communication between the pressure chambers 21a1 and 21b1 of the master cylinder 21 and the reservoir 22. Thus, the working fluid flowing from the wheel cylinders 42FR and 42FL to the master cylinder 21 is returned to the reservoir 22 via the pressure chambers 21a1 and 21b1.

On the other hand, the hydraulic pressure (high-pressure working fluid) of the wheel cylinder 42RR for the rear right wheel is discharged to the reservoir flow passage 57 via the pressure decreasing valve 62RR in the open state, and is returned to the reservoir 22 via the reservoir pipe 14. The hydraulic pressure (high-pressure working fluid) of the wheel cylinder 42RL for the rear left wheel is also discharged to the reservoir flow passage 57 via the pressure decreasing valve 62RL in the open state, and is returned to the reservoir 22 via the reservoir pipe 14.

It should be noted that the present invention does not always require the brake regeneration cooperative control, and hence, as a matter of course, the present invention can be applied to a vehicle on which the regenerative braking force is not generated. In this case, the target hydraulic pressure only needs to be directly calculated based on the brake operation amount. The target hydraulic pressure is set by using a map, a calculation equation, or the like so as to have a larger value as the brake operation amount increases.

Incidentally, in the brake device for a vehicle according to this embodiment, even when a change occurs in the state of the electric power supply from the battery, the driver operating the brake can be prevented from feeling the sense of discomfort, and the change can be coped with by generating appropriate braking forces (securing brake performances). A specific description is now given, in sequence, of a state (a) in which momentary interruption occurs, and a state (b) in which the battery electric power is low for a long period as the change in the state of the electric power supply.

(a) State in which Momentary Interruption Occurs

Under a state in which the driver is carrying out the brake operation on the brake pedal 10 and the brake ECU 100 is carrying out the brake control as described above, for example, when the electric motor 33 starts the rotational drive for maintaining the accumulator pressure Pacc or an electric motor or the like provided on another device starts an operation, a so-called rush current is generated so that momentary interruption may occur. When the momentary interruption occurs, the current supply to the solenoid is interrupted during a momentary interruption period (momentarily) in the general electromagnetic drive circuit without the capacitor and the diode illustrated in FIG. 2. Thus, assuming a state in which the general electromagnetic valve drive circuit is connected to the respective electromagnetic on-off valves 61 to 64 and 72, as a result of the occurrence of the momentary interruption in the supplied electric power, the respective electromagnetic on-off valves 61 to 64 and 72 tend to return to the original positions even when the momentary interruption period is short.

On this occasion, the brake pedal 10 on which the driver is carrying out the brake operation is connected to the wheel cylinders 42FR and 42FL via the master cylinder 21 and the master pressure path including the master pressure pipes 11 and 12 and the master pressure flow passages 53 and 54. Then, the normally-open master cut valves 63 and 64 and the normally-closed simulator cut valve 72 is provided on the master pressure path for transmitting the master cylinder pressures Pmc_FR and Pmc_FL, which are the hydraulic pressures mechanically generated.

Thus, when momentary interruption of the supplied electric power occurs, the holding valves 61FR and 61FL and the pressure decreasing valves 62FR and 62FL operate to shift to the closed states, which correspond to the original positions, on the front right and left wheel sides. Moreover, the master cut valves 63 and 64 operate to shift to the open states, which correspond to the original positions. Further, the simulator cut valve 72 operates to shift to the closed state, which corresponds to the original position.

As a result, for example, when the high-pressure working fluid is supplied from the accumulator 32 to the wheel cylinders 42FR and 42FL by the brake control, in response to the operation of the master cut valves 63 and 64 to shift from the closed states to the open states, there may arise a state in which the high-pressure working fluid flows from the wheel cylinders 42FR and 42FL to the master cylinder 21 via the master pressure path, namely, a state in which the hydraulic pressure is transmitted from the wheel cylinders 42FR and 42FL to the master cylinder 21. Moreover, for example, if the control pressures Px (=wheel cylinder pressures) of the wheel cylinders 42FR and 42FL are less than the master cylinder pressures Pmc_FR and Pmc_FL generated in the master cylinder 21 through the brake operation by the driver, in response to the operation of the master cut valves 63 and 64 to shift to the open states, there may arise a state in which the high-pressure working fluid flows from the master cylinder 21 via the master pressure path to the wheel cylinders 42FR and 42FL, namely, a state in which the hydraulic pressure is transmitted from the master cylinder 21 to the wheel cylinders 42FR and 42FL.

In those cases, the driver continues the brake operation, and hence the communication between the pressure chambers 21a1 and 21b1 of the master cylinder 21 and the reservoir 22 is not permitted. Thus, when the normally-open master cut valves 63 and 64 shift from the closed states to the open states only for a short period as a result of momentary interruption so that the high-pressure working fluid flows from the wheel cylinders 42FR and 42FL via the master pressure path to the master cylinder 21, pressures toward the backward direction may act on the pressure pistons 21a and 21b as a result of a change in the hydraulic pressure toward a high pressure side along with the inflow of the working fluid. As a result, the driver may sense the change in the reaction force via the brake pedal 10. Moreover, when the working fluid flows out from the master cylinder 21 via the master pressure path to the wheel cylinders 42FR and 42FL, the pressure pistons 21a and 21b may be moved forward by a change in the hydraulic pressure toward a low pressure side along with the outflow of the working fluid. As a result, the driver may feel a sense of discomfort for the stroke change in the brake pedal 10.

Moreover, for example, when the simulator cut valve 72 operates to shift from the open state to the closed state as a result of momentary interruption, under a state in which the driver maintains the brake operation on the brake pedal 10 (holds the brake pedal 10), a change does not occur in the working fluid flowing from the master pressure path to the stroke simulator 70 or from the stroke simulator 70 to the master pressure path. Therefore, the driver is less liable to feel, via the brake pedal 10, the sense of discomfort caused by the momentary shift of the simulator cut valve 72 from the open state to the closed state. However, for example, under a state in which the driver is carrying out such a brake operation as further depressing or releasing the brake pedal 10 from the holding state, when the momentary interruption is eliminated, that is, the supply of the electric power is resumed, the simulator cut valve 72 may return to the open state from the closed state due to the shift so that the working fluid flows from the master pressure path to the stroke simulator 70 or from the stroke simulator 70 to the master pressure path. When the inflow or outflow of the working fluid in the master pressure path occurs, the driver may feel the sense of discomfort for the stroke of the brake pedal 10 as a result of the momentary shift from the closed state to the open state of the simulator cut valve 72.

In this respect, according to this embodiment, the capacitor and the diode are provided on the electromagnetic valve drive circuit for supplying the electric power required for the operation only for each of the master cut valves 63 and 64 and the simulator cut valve 72, which are the specific electromagnetic valves that carry out transmission of the master cylinder pressures Pmc_FR and the Pmc_FL being the hydraulic pressures mechanically generated in response to the brake operation on the brake pedal 10. Then, the capacitor provided on the electromagnetic valve drive circuit stores the backup electric power at such a degree that the current supply to the solenoids can be continued during the momentary interruption.

As a result, under the state in which the driver is carrying out the brake operation on the brake pedal 10, even when momentary interruption occurs in the supply to the electric power from the battery, the current supply from the capacitor of the electromagnetic valve drive circuit to each of the solenoids can be maintained, thereby maintaining the normally-open master cut valves 63 and 64 in the closed states, and maintaining the normally-closed simulator cut valve 72 in the open state. Thus, even under a state in which a change occurs in the supply state of the electric power to the brake device for a vehicle, more specifically, under a state in which momentary interruption occurs, a fluctuation does not occur in the master cylinder pressures Pmc_FR and Pmc_FL inside the master pressure path, and the driver does not feel the sense of discomfort caused by the momentary interruption via the brake pedal 10 on which the brake operation is being carried out.

(b) State in which Battery Electric Power is Low for Long Period

For example, if the vehicle is an HV or a PHV, when such a state that an alternator serving as an auxiliary device for an internal combustion engine is not in operation continues for a long period, the various onboard devices including the brake device for a vehicle need to be operated only by the electric power stored in the battery. Thus, when this state continues for a long period, the battery electric power (voltage) gradually decreases. Moreover, even when a consumption amount of the battery electric power is increased by other devices (such as an air conditioner) or when the battery is degraded, the battery electric power (voltage) gradually decreases. Then, when the battery electric power is low for a long period (continuously) as described above, the brake ECU 100 decreases the electric power to be consumed by the brake device for a vehicle, and then carries out the brake control so that the vehicle can be appropriately stopped by applying appropriate braking forces to the wheels in response to the brake operation by the driver on the brake pedal 10.

Specifically, the brake ECU 100 appropriately maintains the accumulator pressure Pacc so as to securely generate the appropriate braking forces on the wheels. In other words, the brake ECU 100 maintains the accumulator pressure Pacc accumulated in the accumulator 32 within a set pressure range by supplying the electric power to the pressure pump 31 (electric motor 33). On this occasion, when the battery electric power is low, and, for example, when the driver is not carrying out the brake operation on the brake pedal 10 or automatic braking is not necessary, that is, when a braking request is not made and the electric power does not need to be supplied to the respective electromagnetic on-off valves 61 to 64 and 72, the brake ECU 100 supplies the electric power to the pressure pump 31 (electric motor 33) by priority. Then, the brake ECU 100 maintains the accumulator pressure Pacc accumulated in the accumulator 32 within the set pressure range.

On this occasion, for example, when the period in which only the battery electric power is used is extending and a decrease in the voltage supplied from the battery is significant (large), the brake ECU 100 stops even the power supply to the pressure pump 31 (electric motor 33), thereby stopping the operation of the pressure pump 31 (electric motor 33). The electric power supplied to the brake ECU 100 itself can be secured by suppressing the power consumption by the pressure pump 31 (electric motor 33) in this way. As a result, the brake ECU 100 can be always activated, and the brake device for a vehicle can be maintained in an operable state.

Further, the brake ECU 100 inhibits the pressure pump 31 (electric motor 33) from operating during the brake control in order to avoid an influence of the rush current generated along with the start of the rotational drive of the pressure pump 31 (electric motor 33). As a result, the influence on the power supply due to the generation of the rush current can be prevented from being imposed on the entire operation of the brake device for a vehicle.

Figure 4:
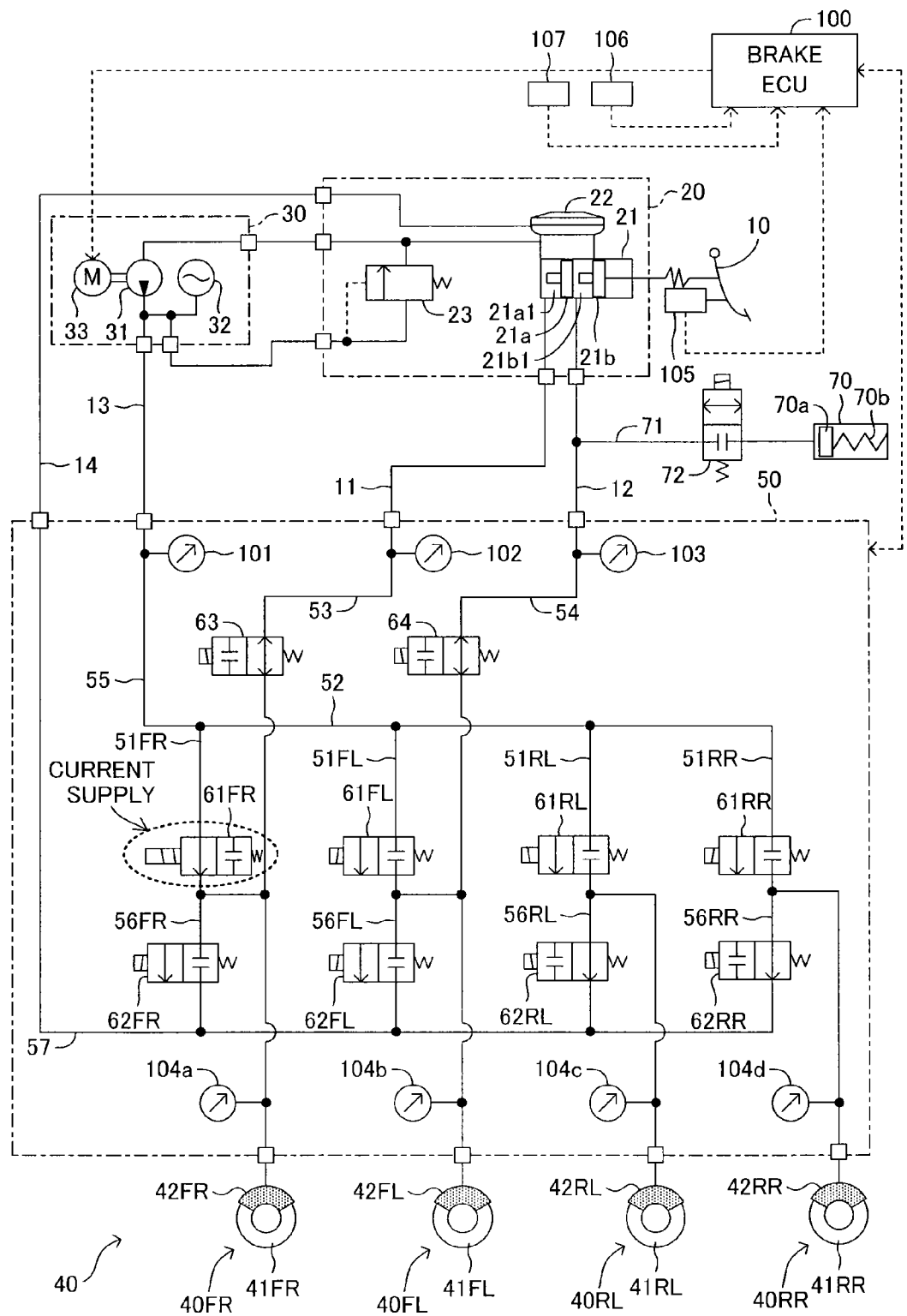
FIG. 4 is a diagram illustrating current supply to a specific electromagnetic valve (holding valve on a front right wheel side) under a state in which battery electric power is low according to the embodiment of the present invention.

Moreover, the brake ECU 100 identifies the electromagnetic valve (electromagnetic on-off valve) required for applying appropriate braking forces to the wheels among the respective electromagnetic on-off valves 61 to 64 and 72 constructing the braking device for vehicle, and supplies the electric power only to the identified electromagnetic valve (electromagnetic on-off valve). Specifically, in this embodiment, as illustrated in FIG. 4, the brake ECU 100 supplies the electric power only to the normally-closed holding valve 61FR, which is the specific electromagnetic valve (electromagnetic on-off valve) provided in the accumulator pressure pipe 13 and the accumulator pressure flow passage 55 connected to the accumulator 32 (the accumulator pressure pipe 13 and the accumulator pressure flow passage 55 are hereinafter collectively referred to as accumulator pressure path), and configured to permit the transmission of the accumulator pressure Pacc at least to the master pressure path. Then, in this embodiment, the accumulator pressure Pacc can be used to generate appropriate braking forces on the front right and left wheels by supplying the electric power only to the normally-closed holding valve 61FR, which is the specific electromagnetic valve (electromagnetic on-off valve), thereby bringing the holding valve 61FR into the open state in this way. A specific description is now given of this point. In this embodiment, the description is given of the case where the appropriate braking forces are generated on the front right and left wheels, but the present invention may be carried out so that appropriate braking forces are generated on the rear right and left wheels.

Under the state in which the battery electric power is low for a long period (continuously), when the driver carries out the brake operation on the brake pedal 10, the brake ECU 100 shuts off the supply of the electric power to the pressure pump 31 (electric motor 33) via the pump drive circuit, and supplies the electric power only to the normally-closed holding valve 61FR via the electromagnetic valve drive circuit. In other words, in this case, as illustrated in FIG. 4, the normally-closed holding valve 61FR is brought into the open state by the current supply, but the holding valves 61FL, 61RR, and 61RL are maintained in the closed states, which correspond to the original positions, the pressure decreasing valves 62FR and 62FL are maintained in the closed states, which correspond to the original positions, and the pressure decreasing valves 62RR and 62RL are maintained in the open states, which correspond to the original positions. Moreover, the master cut valves 63 and 64 are maintained in the open states, which correspond to the original positions, and the simulator cut valve 72 is maintained in the closed state, which corresponds to the original position.

Figure 5:
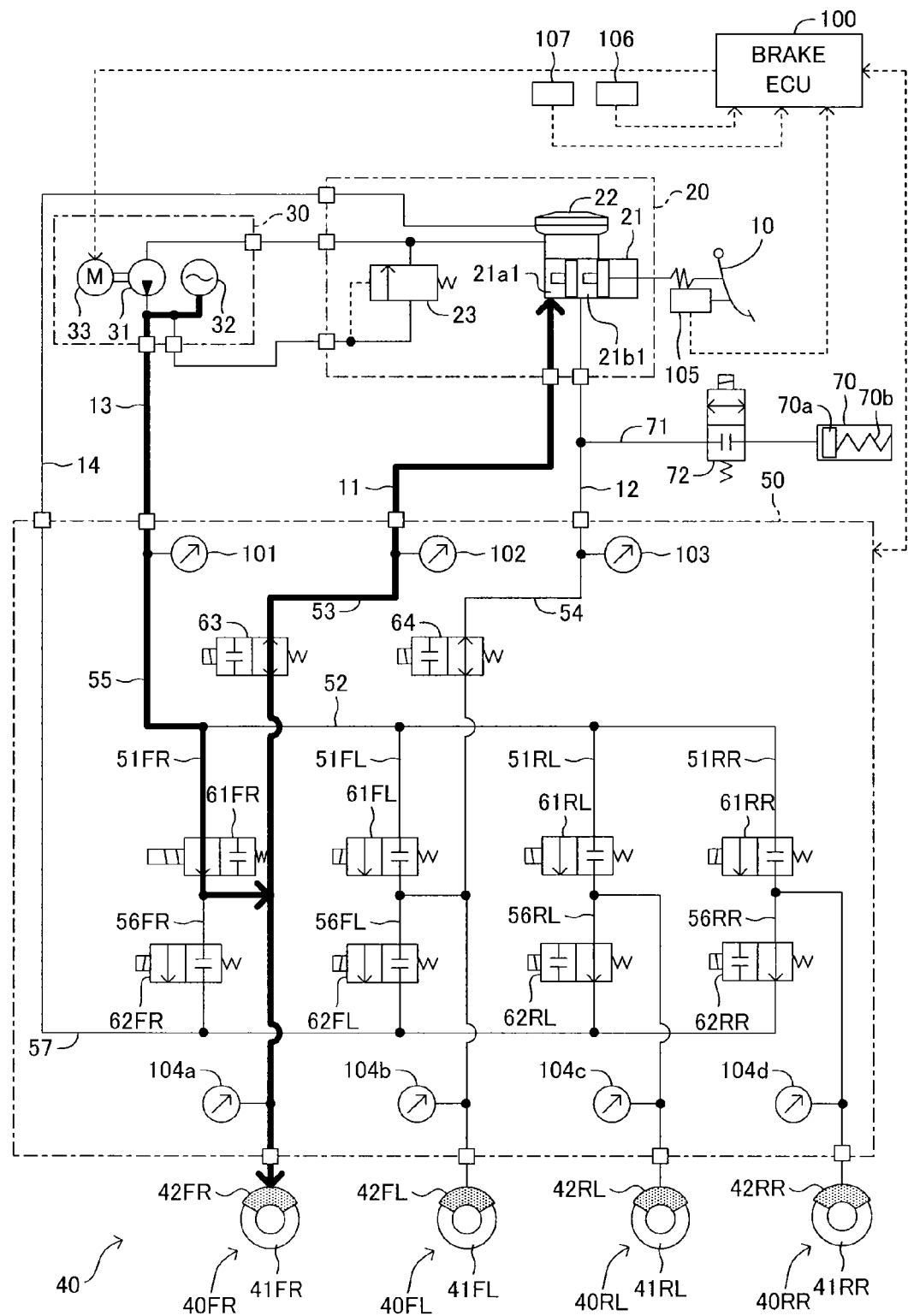
FIG. 5 is a diagram illustrating transmission of an accumulator pressure from an accumulator to a master cylinder as a result of the current supply of FIG. 4.

As a result, as illustrated in FIG. 5, the accumulator pressure Pacc accumulated in the accumulator 32 is transmitted through the accumulator pressure path, passes through the main flow passage 52, the individual flow passage 51FR, and the holding valve 61FR, and reaches the master pressure path on the front right wheel side. As a result, the accumulator pressure Pacc is transmitted to the wheel cylinder 42FR of the brake unit 40FR for the front right wheel connected to the master pressure path, and is transmitted to the pressure chamber 21a1 of the master cylinder 21 connected to the master pressure path. Thus, the high-pressure working fluid is supplied to the wheel cylinder 42FR so that an excellent braking force can be applied to the front right wheel.

Figure 6:
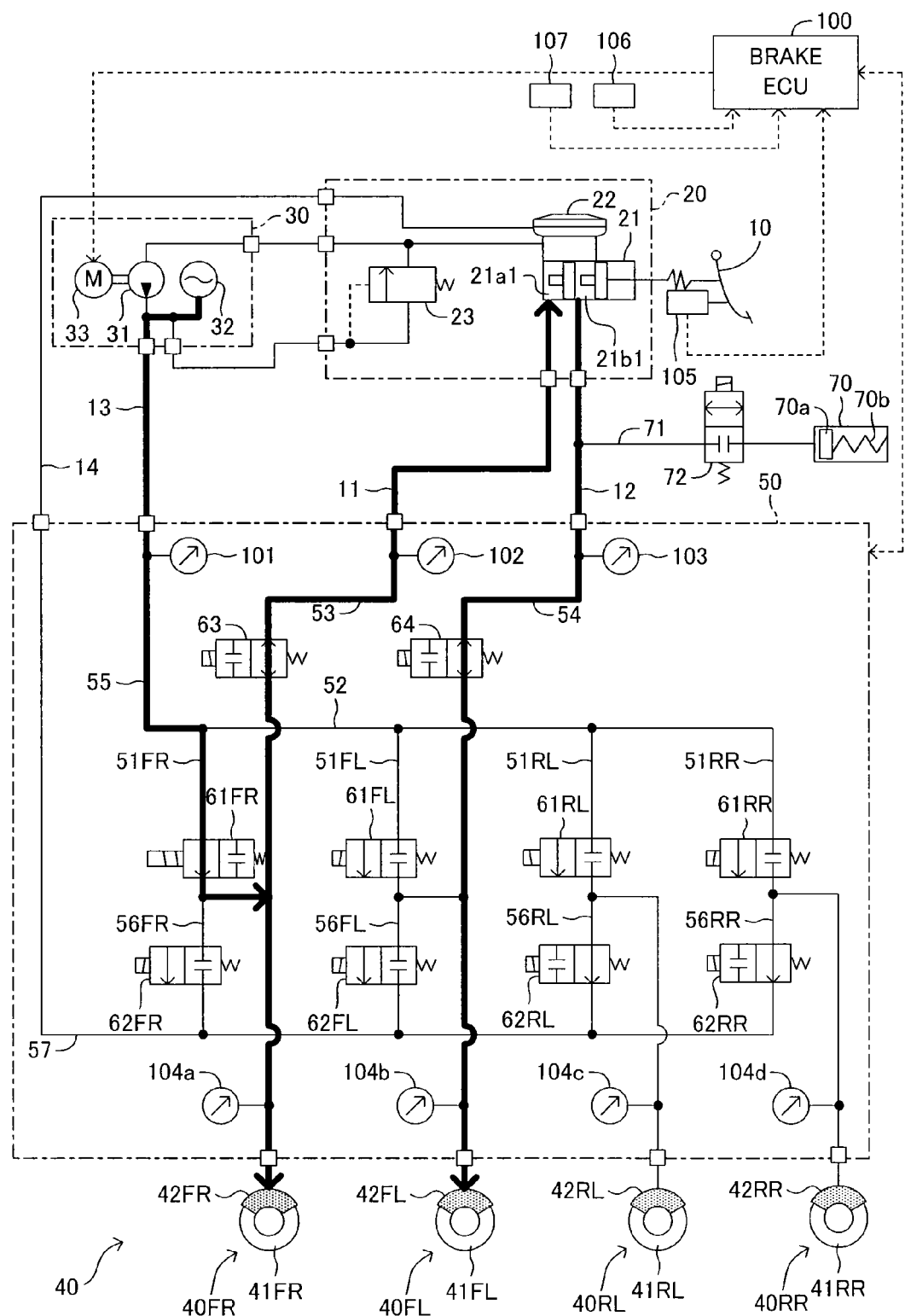
FIG. 6 is a diagram illustrating transmission of a master cylinder pressure from the master cylinder to a wheel cylinder on a front left wheel side as a result of the transmission of the accumulator pressure of FIG. 5.

On the other hand, when the accumulator pressure Pacc is transmitted to the pressure chamber 21a1 of the master cylinder 21, the brake operation is being carried out on the brake pedal 10 by the driver, and hence the hydraulic pressure in the pressure chamber 21b1 of the master cylinder 21 becomes a high pressure against a friction of the pressure piston 21b. As a result, as illustrated in FIG. 6, the high-pressure working fluid is supplied to the wheel cylinder 42FL of the brake unit 40FL for the front left wheel connected to the master pressure path on the front left wheel side including the master pressure pipe 12 and the master pressure flow passage 54. Thus, the wheel cylinder 42FL can apply the excellent braking force to the front left wheel.

Moreover, through the transmission of the accumulator pressure Pacc to the master cylinder 21 in this way, that is, through the control of the working fluid to flow back from the accumulator 32 to the master cylinder 21, the flowed-back working fluid can be controlled to act to gradually return the brake pedal 10 coupled to the master cylinder 21. For example, the hydraulic pressure of the flowed-back working fluid is preferably adjusted by a throttle mechanism in order to use the flowed-back working fluid to gradually return the brake pedal 10. As a result, the driver can carry out the brake operation by depressing the brake pedal 10, which slowly returns or is returning, and can therefore depress the brake pedal 10 through a small stroke while sensing the appropriate reaction force, thereby being capable of generating the appropriate braking force and gaining a sense of security.

As appreciated from the above description, according to this embodiment, the operations can be backed up only for the master cut valves 63 and 64 and the simulator cut valve 72, which are the specific electromagnetic valves that carry out transmission of the master cylinder pressures Pmc_FR and Pmc_FL mechanically generated on the master cylinder 21 in response to the operation on the brake pedal 10 directly operated by the driver. Thus, the master cut valves 63 and 64 and the simulator cut valve 72 can be controlled to continue the operation regardless of presence or absence of the momentary interruption, which is a change in the state of the electric power supply.

Further, the electrical capacity at such a degree that the operations are maintained during the momentary interruption period only needs to be secured as the backup electric power in order to control the master cut valves 63 and 64 and the simulator cut valve 72 to operate in response to the momentary interruption. As a result, the backup electric power can be appropriately suppressed so that the increase in cost can be avoided. Moreover, the operations of the master cut valves 63 and 64 and the simulator cut valve 72 are backed up so that the driver can be made less liable to feel the sense of discomfort for the operation via the brake pedal 10, namely, the change in the magnitude of the reaction force and the change in the magnitude of the stroke. Thus, the decrease in merchantability of the brake device for a vehicle can be effectively prevented, and hence, for example, both of the cost reduction and the securement of merchantability can be appropriately realized.

Moreover, for example, under the state in which the function of an alternator or the like is not exerted and the battery electric power is thus low for a long period as the change in the state of the electric power supply, in this embodiment, the brake ECU 100 can supply the electric power, by priority, to the holding valve 61FR, which is the specific electromagnetic valve that carries out transmission of the accumulator pressure Pacc from the accumulator 32 in order to secure an excellent brake performance. As a result, even under a state in which the battery electric power is low and, for example, the brake control for generating the braking forces on the front right and left wheels and the rear right and left wheels is thus restricted, the accumulator pressure Pacc accumulated in the accumulator 32 can be transmitted to the wheel cylinders 42FR and 42FL for the front right and left wheels, thereby securely applying the braking forces to the wheels on the front right and left wheel sides. Thus, an excellent braking performance can be secured.

<Modified Example>

In the embodiment described above, the description has been given of the brake device for a vehicle, which is configured to operate the holding valves 61 and the pressure decreasing valves 62 to open or close so as to supply the accumulator pressure Pacc from the accumulator 32, thereby appropriately adjusting the control pressures Px (=wheel cylinder pressures) in the wheel cylinders 42 of the brake units 40. In this case, the present invention may be carried out with use of a brake device for a vehicle, including linear control valves for linearly controlling the accumulator pressure Pacc, which are provided on the accumulator path on the upstream side of the holding valves 61 and the pressure decreasing valves 62, and being configured to use the linear control valves so as to adjust the accumulator pressure Pacc, thereby attaining the control pressures Px and supplying the control pressures Px to the respective wheel cylinders 42. A detailed description is now given of the modified example. Like components are denoted by like numerals as in the embodiment described above, and a detailed description thereof is omitted.

Figure 7:
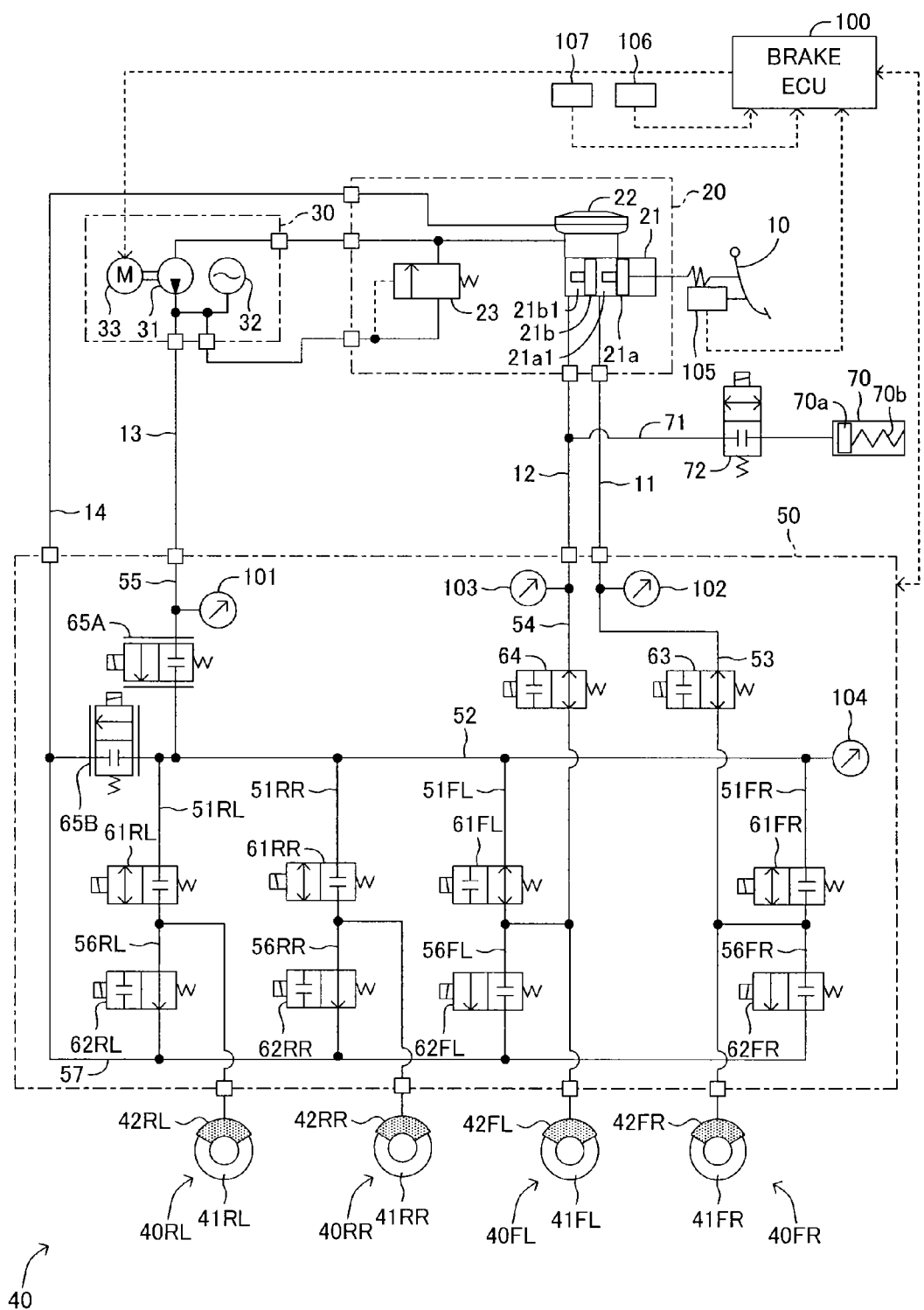
FIG. 7 is a schematic system diagram of the brake device for a vehicle according to a modified example of the embodiment of the present invention.

As illustrated in FIG. 7, a pressure increasing linear control valve 65A is provided on the accumulator pressure flow passage 55 in the brake device for a vehicle according to the modified example. Moreover, a pressure decreasing linear control valve 65B is provided between the main flow passage 52 connected to the accumulator pressure flow passage 55 and the reservoir flow passage 57 in the brake device for a vehicle according to the modified example.

The pressure increasing linear control valve 65A and the pressure decreasing linear control valve 65B are normally-closed electromagnetic linear control valves each being configured to be maintained in a closed state by a biasing force of a spring in a non-current supply state of a solenoid and to increase a valve opening degree as a current supply amount (current value) to the solenoid increases. Although the detailed description is omitted, in the non-current supply state of the solenoid, each of the pressure increasing linear control valve 65A and the pressure decreasing linear control valve 65B is maintained in the closed state by a valve closing force represented by a difference between a spring force for biasing a valve element toward a closing direction by the built-in spring and a pressure difference force for biasing the valve element toward an opening direction by a pressure difference between a primary side (inlet side) on which the working fluid relatively higher in pressure is caused to flow and a secondary side (outlet side) on which the working fluid relatively lower in pressure is caused to flow.

Further, each of the pressure increasing linear control valve 65A and the pressure decreasing linear control valve 65B opens at an opening degree corresponding to a balance between the forces acting on the valve element when an electromagnetic attraction force generated by the current supply to the solenoid so as to act toward the direction to open the valve element exceeds the valve closing force, that is, when a relationship of electromagnetic attraction force>valve closing force (=spring force-pressure difference force) is satisfied. Thus, each of the pressure increasing linear control valve 65A and the pressure decreasing linear control valve 65B can control the current supply amount (current value) to the solenoid, thereby adjusting the opening degree corresponding to the pressure difference force, namely, the pressure difference between the primary side (inlet side) and the secondary side (outlet side).

Moreover, in the embodiment described above, the present invention is carried out on the assumption that all the holding valves 61 are the normally-closed electromagnetic on-off valves and, among the pressure decreasing valves 62, the pressure decreasing valves 62FR and 62FL are the normally-closed electromagnetic on-off valves and the pressure decreasing valves 62RR and 62RL are the normally-open electromagnetic on-off valves. However, in the modified example, as illustrated in FIG. 7, for example, the present invention is carried out on the assumption that only the holding valve 61FL is the normally-open electromagnetic on-off valve and the holding valves 61FR, 61RR, and 61RL are the normally-closed electromagnetic on-off valves.

Also in the modified example configured in this way, as in the embodiment described above, when the brake control is carried out, the brake ECU 100 maintains the normally-open master cut valves 63 and 64 in the closed state by the current supply to the solenoids, and maintains the simulator cut valve 72 in the open state by the current supply to the solenoid. Then, in the modified example, the brake ECU 100 controls current supply amounts (current values) to the solenoids of the pressure increasing linear control valve 65A and the pressure decreasing linear control valve 65B so that the pressure increasing linear control valve 65A and the pressure decreasing linear control valve 65B are controlled at respective opening degrees corresponding to the current supply amounts. Further, in the modified example, the brake ECU 100 maintains the normally-open holding valve 61FL in the open state, and maintains the normally-closed holding valves 61FR, 61RR, and 61RL in the open state by the current supply to the solenoids. Still further, the brake ECU 100 maintains the normally-open pressure decreasing valves 62RR and 62RL in the closed state by the current supply to the solenoids, and maintains the normally-closed pressure decreasing valves 62FR and 62FL in the closed state.

In the modified example, the pressure increasing linear control valve 65A and the pressure decreasing linear control valve 65B are in the current supply control state of the solenoids, and hence the accumulator pressure Pacc output from the power hydraulic pressure generation device 30 is adjusted by the pressure increasing linear control valve 65A and the pressure decreasing linear control valve 65B, and is transmitted to the wheel cylinders 42 at the four wheels. Further, in the modified example, the holding valves 61 are maintained in the open state, and the pressure decreasing valves 62 are maintained in the closed state. Thus, the respective wheel cylinders 42 communicate to the main flow passage 52, and all the wheel cylinder pressures have the same value at the four wheels.

As described above, also in the brake device for a vehicle according to the modified example, which operates in accordance with the brake control, as in the embodiment described above, under the state (a) in which momentary interruption occurs, and under the state (b) in which the battery electric power is low for a long period (continuously), the driver operating the brake can be prevented from feeling the sense of discomfort, and those states can be coped with by generating appropriate braking forces. However, the modified example is more or less different from the embodiment described above under the state (b) in which the battery electric power is low for a long period (continuously).

Figure 8:
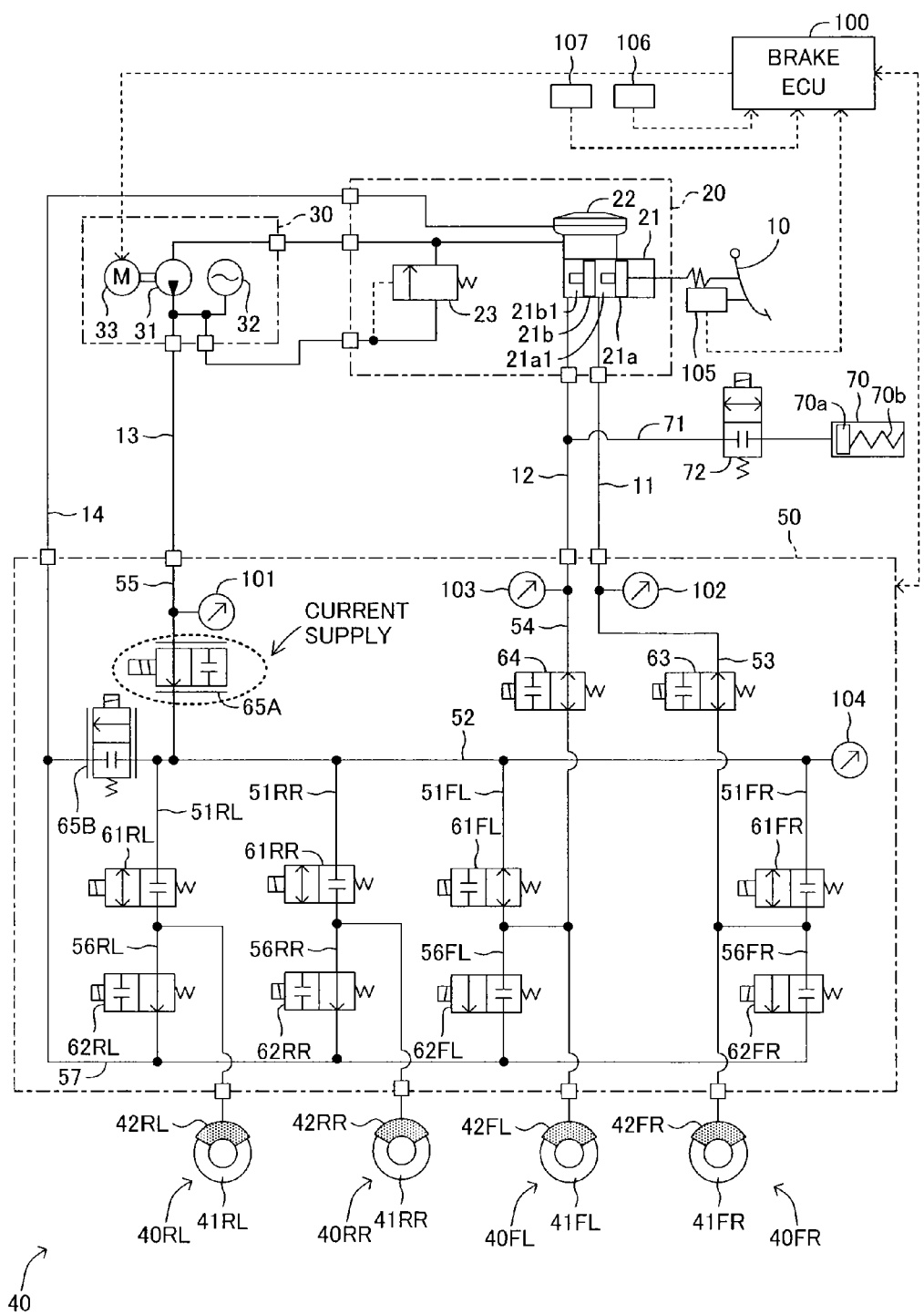
FIG. 8 is a diagram illustrating current supply to a specific electromagnetic valve (pressure increasing linear control valve) under a state in which the battery electric power is low according to the modified example of the embodiment of the present invention.

In other words, when the driver carries out the brake operation on the brake pedal 10 under the state in which the battery electric power is low for a long period, the brake ECU 100 shuts off the supply of the electric power to the pressure pump 31 (electric motor 33) as in the embodiment described above. In the modified example, as illustrated in FIG. 8, the brake ECU 100 supplies the electric power only to the normally-closed pressure increasing linear control valve 65A, which is the specific electromagnetic valve (electromagnetic on-off valve) provided on the accumulator pressure path connected to the accumulator 32 and is configured to permit the transmission of the accumulator pressure Pacc to at least the master pressure path. In other words, in this case, the normally-closed pressure increasing linear control valve 65A is maintained in the open state, but the pressure decreasing linear control valve 65B is maintained in the closed state, which corresponds to the original position. Moreover, the holding valve 61FL is maintained in the open state, which corresponds to the original position, and the holding valves 61FR, 61RR, and 61RL are maintained in the closed states which correspond to the original positions. Further, the pressure decreasing valves 62FR and 62FL are maintained in the closed states, which correspond to the original positions, and the pressure decreasing valves 62RR and 62RL are maintained in the open states, which correspond to the original positions. Moreover, the master cut valves 63 and 64 are maintained in the open states, which correspond to the original positions, and the simulator cut valve 72 is maintained in the closed state, which corresponds to the original position.

Figure 9:
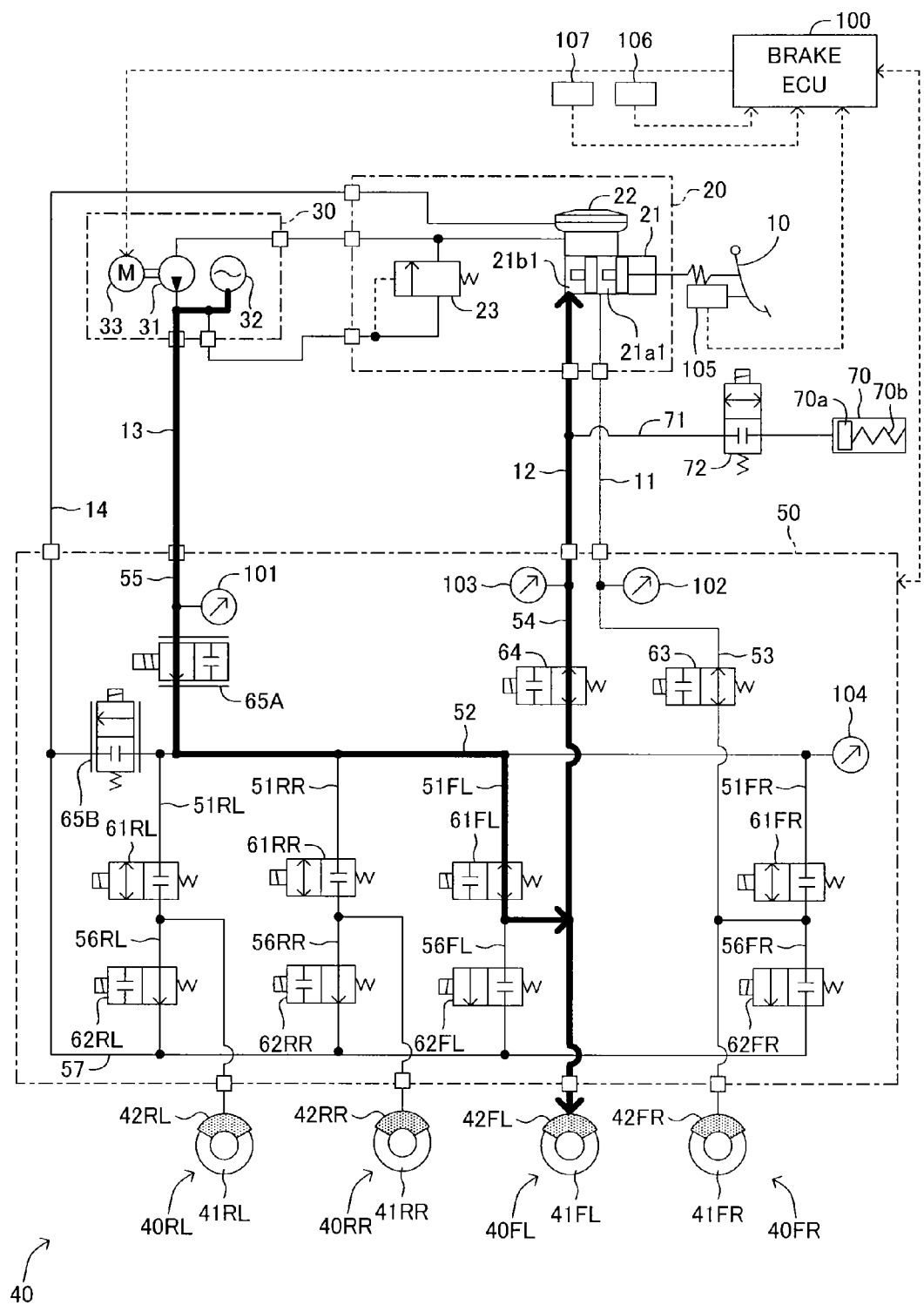
FIG. 9 is a diagram illustrating the transmission of the accumulator pressure from the accumulator to the master cylinder as a result of the current supply of FIG. 8.

As a result, as illustrated in FIG. 9, the accumulator pressure Pacc accumulated in the accumulator 32 is transmitted via the pressure increasing linear control valve 65A through the accumulator pressure path, passes through the main flow passage 52, the individual flow passage 51FL, and the holding valve 61FL, and reaches the master pressure path on the front left wheel side. As a result, in the modified example, the accumulator pressure Pacc is transmitted to the wheel cylinder 42FL of the brake unit 40FL for the front left wheel connected to the master pressure path, and is transmitted to the pressure chamber 21$b$1 of the master cylinder 21 connected to the master pressure path. Thus, the high-pressure working fluid is supplied to the wheel cylinder 42FL, and therefore an excellent braking force can be applied to the front left wheel.

Figure 10:
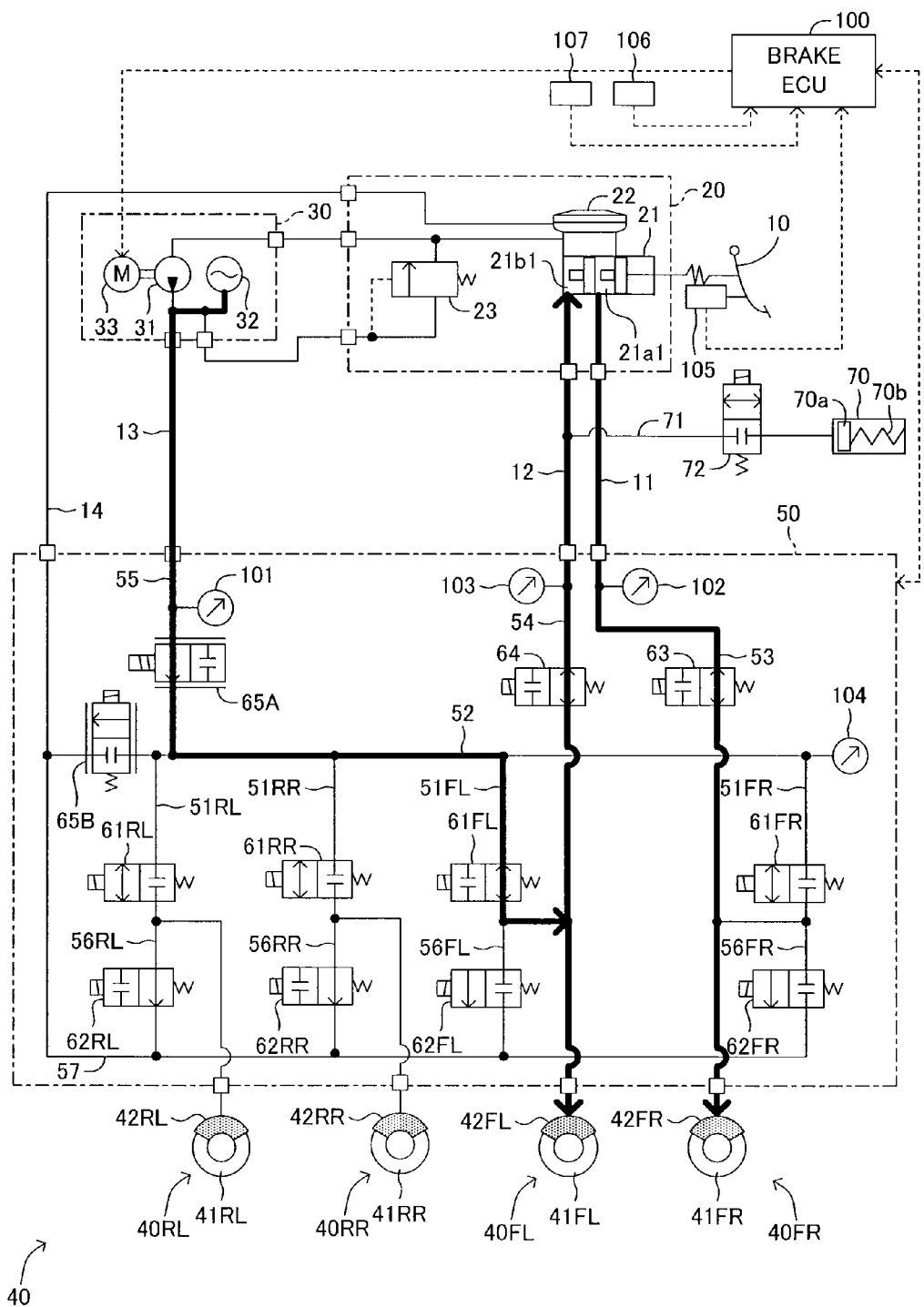
FIG. 10 is a diagram illustrating the transmission of the master cylinder pressure from the master cylinder to the wheel cylinder on the front left wheel side as a result of the transmission of the accumulator pressure of FIG. 9.

Also in the modified example, the brake operation is being carried out on the brake pedal 10 by the driver, and hence, through the transmission of the accumulator pressure Pacc to the pressure chamber 21$b$1 of the master cylinder 21, the hydraulic pressure in the pressure chamber 21$a$1 of the master cylinder 21 becomes a high pressure against a friction of the pressure piston 21$a$. Consequently, as illustrated in FIG. 10, the high-pressure working fluid is supplied to the wheel cylinder 42FR of the brake unit 40FR for the front right wheel via the master pressure path on the front right wheel side. Thus, the wheel cylinder 42FR can apply an excellent braking force to the front right wheel.

Further, also in the modified example, the working fluid can be controlled to flow back from the accumulator 32 to the master cylinder 21, and hence the flowed-back working fluid can be controlled to act to gradually return the brake pedal 10 coupled to the master cylinder 21. As a result, the driver can carry out the brake operation by depressing the brake pedal 10, which slowly returns or is returning, and can therefore depress the brake pedal 10 through a small stroke while sensing the appropriate reaction force, thereby being capable of generating the appropriate braking force and gaining a sense of security.

As appreciated from the above description, the same effects as those of the embodiment described above are provided also in the modified example.

In carrying out the present invention, the present invention is not limited to the embodiment and the modified example described above, and different kinds of changes may be made thereto without departing from an object of the present invention.

For example, in the embodiment and the modified example described above, the capacitor and the diode are provided as backup electric power supply means for the electromagnetic valve drive circuit connected to each of the limited electromagnetic valves (electromagnetic on-off valves) in order to cope with the state (a) in which momentary interruption occurs. As a result, the present invention is carried out so that the master cut valves 63 and 64 and the simulator cut valve 72, which are provided on the master pressure path and configured to transmit the hydraulic pressures mechanically generated in response to the operation on the brake pedal 10, are electrically backed up by the capacitor provided on the electromagnetic valve drive circuit, and even when momentary interruption occurs, the current supply state to each of the solenoids is maintained. In this case, the present invention may be carried out so that a normally-open back pressure decreasing control valve, which is provided on the master cylinder 21 and configured to carry out transmission of the mechanically generated hydraulic pressure, may be electrically backed up in place of or in addition to the master cut valves 63 and 64 and the simulator cut valve 72.

The normally-open back pressure decreasing control valve is maintained in the closed state by current supply to a solenoid, and is configured to control the back pressures (mechanically generated hydraulic pressures) of the pressure pistons 21a and 21b of the master cylinder 21. As a result, the back pressures of the pressure pistons 21a and 21b are appropriately controlled, thereby being capable of appropriately securing the stroke of the brake pedal 10 caused by the brake operation by the driver and the reaction force sensed via the brake pedal 10. Thus, when the back pressure decreasing control valve is shifted from the closed state to the open state as a result of the momentary interruption, the driver may feel a sense of discomfort for the change in the stroke and the change in the reaction force of the brake pedal 10.

Therefore, even when momentary interruption occurs, the current supply to the solenoid can be continued to maintain the closed state by providing the capacitor and the diode for the electromagnetic valve drive circuit connected to the back pressure decreasing control valve in order to secure the backup electric power as in the embodiment and the modified example described above. Thus, the back pressure, which is the mechanically generated hydraulic pressure, does not fluctuate, and hence the driver can be effectively prevented from feeling the sense of discomfort for the change in the stroke and the change in the reaction force of the brake pedal 10.

Moreover, in the embodiment described above, the present invention is carried out so that the master cut valves 63 and 64 and the simulator cut valve 72 are electrically backed up. In this case, as a matter of course, the present invention may be carried out so that only one of the master cut valves 63 and 64 and the simulator cut valve 72 is electrically backed up. In this case, the current supply to the electromagnetic valve (electromagnetic on-off valve) thus electrically backed up is maintained, and hence, for example, the driver can be effectively prevented from feeling the sense of discomfort via the brake pedal 10.

Moreover, in the embodiment described above, the present invention is carried out so that the accumulator pressure Pacc is transmitted to the master pressure path and therefore to the wheel cylinders 42 and the master cylinder 21 under the state (b) in which the battery electric power is low for a long period (continuously). In this case, the present invention may be carried out so that the accumulator pressure Pacc is supplied to a hydro booster provided on the master cylinder 21. Also in this case, the accumulator pressure Pacc is supplied as a servo pressure to the hydro booster, with the result that the high-pressure master cylinder pressures Pmc_FR and Pmc_FL can be supplied to the wheel cylinders 42FR and 42FL for the front right and left wheels via the master pressure path. Thus, the same effects as those of the embodiment described above can be expected.

Further, the present invention may be carried out so that a pressure increasing mechanism for increasing (carrying out servo control for) at least one of the master cylinder pressures Pmc_FR and Pmc_FL output from the master cylinder 21 for supply to the wheel cylinders 42FR and 42FL, or for supplying a servo pressure to the hydro booster provided on the master cylinder 21 is provided on the brake device for a vehicle according to the embodiment and the modified example described above. In this case, a mechanism configured to operate as a mechanical pressure increasing device (mechanical valve), which is configured to mechanically operate in response to the brake operation by the driver to generate a servo pressure, is preferred as the pressure increasing mechanism.

The invention claimed is:

1. A brake device for a vehicle, comprising:
    a master cylinder for generating a hydraulic pressure in response to an operation by a driver on a brake pedal;
    a power hydraulic pressure source for generating a hydraulic pressure through drive of a pressure pump;
    a valve mechanism comprising a plurality of electromagnetic valves to be controlled by electric signals, for carrying out transmission of the hydraulic pressure output from the master cylinder or the power hydraulic pressure source, the plurality of electromagnetic valves powered by an electric power storage device;
    a wheel cylinder for applying a braking force to a wheel through the transmission of the hydraulic pressure output from the master cylinder or the power hydraulic pressure source via the valve mechanism; and
    an electric power supply part for supplying electric power from the electric power storage device installed on the vehicle to the plurality of electromagnetic valves,
    the electric power supply part being configured to provide backup electric power, independently of the electric power to be supplied from the electric power storage device, to only a specific electromagnetic valve that is one of the plurality of electromagnetic valves that carry out the transmission of the hydraulic pressure mechanically generated by the master cylinder in response to the operation on the brake pedal.

2. A brake device for a vehicle according to claim 1, wherein the specific electromagnetic valve is an electromagnetic valve for fluctuating, when the electric power supplied by the electric power supply part from the electric power storage device is shut off, a hydraulic pressure mechanically generated by the master cylinder in response to an operation caused by the shutoff of the supply of the electric power.

3. A brake device for a vehicle according to claim 2, wherein the fluctuation in the hydraulic pressure mechanically generated by the master cylinder comprises changing of a magnitude of a reaction force input to the brake pedal in response to the operation by the driver, or a magnitude of a stroke of the brake pedal operated by the driver.

4. A brake device for a vehicle according to claim 1, wherein the specific electromagnetic valve is a normally-open electromagnetic on-off valve, which is supplied with the electric power by the electric power supply part so as to be maintained in a closed state at least when the brake pedal is being operated by the driver.

5. A brake device for a vehicle according to claim 4, wherein the normally-open electromagnetic on-off valve comprises a master cut valve, which is provided on a hydraulic pressure path through which the hydraulic pressure mechanically generated by the master cylinder is transmitted in response to the operation on the brake pedal, and is supplied with the electric power by the electric power supply part so as to be maintained in the closed state when the hydraulic pressure from the power hydraulic pressure source is being transmitted to the wheel cylinder, to thereby inhibit the hydraulic pressure mechanically generated by the master cylinder from being transmitted to the wheel cylinder.

6. A brake device for a vehicle according to claim 1, wherein the specific electromagnetic valve is a normally-closed electromagnetic on-off valve, which is supplied with the electric power by the electric power supply part so as to be maintained in an open state at least when the brake pedal is being operated by the driver.

7. A brake device for a vehicle according to claim 6, wherein the normally-closed electromagnetic on-off valve comprises a simulator cut valve, which is provided on a hydraulic pressure path through which the hydraulic pressure mechanically generated by the master cylinder is transmitted in response to the operation on the brake pedal, and is supplied with the electric power by the electric power supply part so as to be maintained in the open state at least when the hydraulic pressure from the power hydraulic pressure source is being transmitted to the wheel cylinder, to thereby permit communication between the master cylinder and a stroke simulator for adjusting the magnitude of the reaction force applied to the brake pedal operated by the driver and the magnitude of the stroke of the brake pedal.

8. A brake device for a vehicle according to claim 1, wherein an electrical capacity of the secured backup electric power comprises an electrical capacity for maintaining, in the event of momentary interruption in which the supply of the electric power from the electric power storage device is momentarily interrupted, the operation of the specific electromagnetic valve at least during the momentary interruption.

9. A brake device for a vehicle, comprising:
a master cylinder for generating a hydraulic pressure in response to an operation by a driver on a brake pedal;
a power hydraulic pressure source for generating a hydraulic pressure through drive of a pressure pump;
a valve mechanism comprising a plurality of electromagnetic valves to be controlled by electric signals, for carrying out transmission of the hydraulic pressure output from the master cylinder or the power hydraulic pressure source;
a wheel cylinder for applying a braking force to a wheel through the transmission of the hydraulic pressure output from the master cylinder or the power hydraulic pressure source via the valve mechanism; and
an electric power supply control part for controlling supply of electric power from an electric power storage device installed on the vehicle to the plurality of electromagnetic valves constructing the valve mechanism and to the power hydraulic pressure source,
the electric power supply control part being configured to:
limit, under a state in which the electric power stored in the electric power storage device is low, the plurality of electromagnetic valves constructing the valve mechanism to a specific electromagnetic valve that carries out the transmission of the hydraulic pressure from the power hydraulic pressure source, to thereby supply the electric power from the electric power storage device to the limited specific electromagnetic valve by priority, and
inhibit, under the state in which the electric power stored in the electric power storage device is low, the supply of the electric power from the electric power storage device to an electric motor constricting the pressure pump when the brake pedal is being operated by the driver.

10. A brake device for a vehicle according to claim 9, wherein:
the power hydraulic pressure source comprises an accumulator for accumulating the hydraulic pressure generated through the drive of the pressure pump; and
the specific electromagnetic valve comprises at least an electromagnetic valve provided on a hydraulic pressure path for communicating the accumulator of the power hydraulic pressure source and the master cylinder to each other.

11. A brake device for a vehicle according to claim 10, wherein the hydraulic pressure path for communicating the accumulator of the power hydraulic pressure source and the master cylinder to each other further communicates to the wheel cylinder for applying the braking force to a wheel on a front wheel side of the vehicle.

12. A brake device for a vehicle according to claim 11, wherein the specific electromagnetic valve comprises a normally-closed electromagnetic on-off valve for permitting or inhibiting the communication between the power hydraulic pressure source and the wheel cylinder for applying the braking force to the wheel on the front wheel side.

13. A brake device for a vehicle according to claim 10, wherein, under the state in which the electric power stored in the electric power storage device is low, the electric power supply control part supplies the electric power from the electric power storage device to the electric motor constructing the pressure pump when the brake pedal is not being operated by the driver, to thereby accumulate, in the accumulator, the hydraulic pressure generated through the drive of the pressure pump.

14. A brake device for a vehicle according to claim 10, wherein the specific electromagnetic valves comprise a normally-closed linear control valve for outputting the hydraulic pressure from the power hydraulic pressure source through linear control.

15. A brake device for a vehicle according to claim 9, wherein the specific electromagnetic valve comprises a normally-closed linear control valve for outputting the hydraulic pressure from the power hydraulic pressure source through linear control.

16. A brake device for a vehicle according to claim 9, wherein the specific electromagnetic valve comprises a normally-closed electromagnetic on-off valve for permitting or inhibiting the communication between the power hydraulic pressure source and the wheel cylinder for applying the braking force to the wheel on the front wheel side.

17. A brake device for a vehicle according to claim 9, wherein, under a state in which the electric power stored in the electric power storage device is significantly low, the electric power supply control part inhibits the supply of the electric power from the electric power storage device to the electric motor constructing the pressure pump.

\* \* \* \* \*